United States Patent
Sasabe et al.

(10) Patent No.: US 10,507,429 B2
(45) Date of Patent: Dec. 17, 2019

(54) ELECTROCHEMICAL CELL, WATER TREATMENT DEVICE PROVIDED WITH SAME, AND OPERATING METHOD FOR WATER TREATMENT DEVICE

(71) Applicant: Panasonic Intellectual Property Management Co., Ltd., Osaka-shi, Osaka (JP)

(72) Inventors: Shigeru Sasabe, Shiga (JP); Daisuke Suzuki, Shiga (JP); Tomoko Tani, Osaka (JP); Noriyoshi Ueya, Osaka (JP); Katsuhiko Uno, Shiga (JP); Masahiro Ohama, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 73 days.

(21) Appl. No.: 15/780,060

(22) PCT Filed: Oct. 31, 2016

(86) PCT No.: PCT/JP2016/004767
§ 371 (c)(1),
(2) Date: May 30, 2018

(87) PCT Pub. No.: WO2017/119019
PCT Pub. Date: Jul. 13, 2017

(65) Prior Publication Data
US 2018/0369755 A1    Dec. 27, 2018

(30) Foreign Application Priority Data

Jan. 8, 2016    (JP) .................................. 2016-002320

(51) Int. Cl.
*B01D 61/44*     (2006.01)
*B01D 61/46*     (2006.01)
(Continued)

(52) U.S. Cl.
CPC ........... *B01D 61/445* (2013.01); *B01D 61/46* (2013.01); *B01D 61/54* (2013.01); *B01D 65/02* (2013.01);
(Continued)

(58) Field of Classification Search
CPC ...... B01D 61/445; B01D 61/54; B01D 61/46; B01D 65/02; B01D 2313/14;
(Continued)

(56) References Cited

U.S. PATENT DOCUMENTS

2005/0029124 A1    2/2005 Holmes et al.
2006/0016685 A1    1/2006 Hawkins et al.
(Continued)

FOREIGN PATENT DOCUMENTS

JP      11-057420       3/1999
JP      2001-058182     3/2001
(Continued)

*Primary Examiner* — Arun S Phasge
(74) *Attorney, Agent, or Firm* — Hamre, Schumann, Mueller & Larson, P.C.

(57) ABSTRACT

An electrochemical cell according to the present disclosure includes a casing provided with an inflow port and an outflow port, a bipolar membrane laminated body in which two or more bipolar membranes are laminated so as to be opposed, electrodes disposed so as to sandwich the bipolar membrane laminated body, and a first diffusion member disposed between the inflow port and the bipolar membrane laminated body, and provided with through holes communicating between the inflow port and the bipolar membrane laminated body. The first diffusion member is formed such that each of the through holes provided in a peripheral edge portion has a larger opening area than an opening area of the through holes provided in a central portion. This can uniformize a flow of water, so that water treatment can be efficiently executed.

25 Claims, 14 Drawing Sheets

(51) Int. Cl.
*B01D 65/02* (2006.01)
*B01D 61/54* (2006.01)
*C02F 1/00* (2006.01)
*C02F 1/46* (2006.01)
*C02F 1/469* (2006.01)

(52) U.S. Cl.
CPC ............ *C02F 1/008* (2013.01); *C02F 1/4602* (2013.01); *C02F 1/4693* (2013.01); *C02F 2209/40* (2013.01); *C02F 2303/16* (2013.01)

(58) Field of Classification Search
CPC ... B01D 2321/162; B01D 61/50; C02F 1/008; C02F 1/4602; C02F 1/4693; C02F 2209/40; C02F 2303/16; C02F 2201/4613; C02F 2209/005; C02F 2209/006; C02F 2209/42
See application file for complete search history.

(56) References Cited

U.S. PATENT DOCUMENTS

2007/0175766 A1    8/2007  Holmes et al.
2017/0057848 A1*   3/2017  Sasabe .................... B01J 47/12

FOREIGN PATENT DOCUMENTS

| | | |
|---|---|---|
| JP | 2002-210456 | 7/2002 |
| JP | 2007-501702 | 2/2007 |
| JP | 2008-507406 | 3/2008 |
| JP | 2010-162496 | 7/2010 |
| JP | 2011-152489 | 8/2011 |
| JP | 2016-000391 | 1/2016 |

* cited by examiner

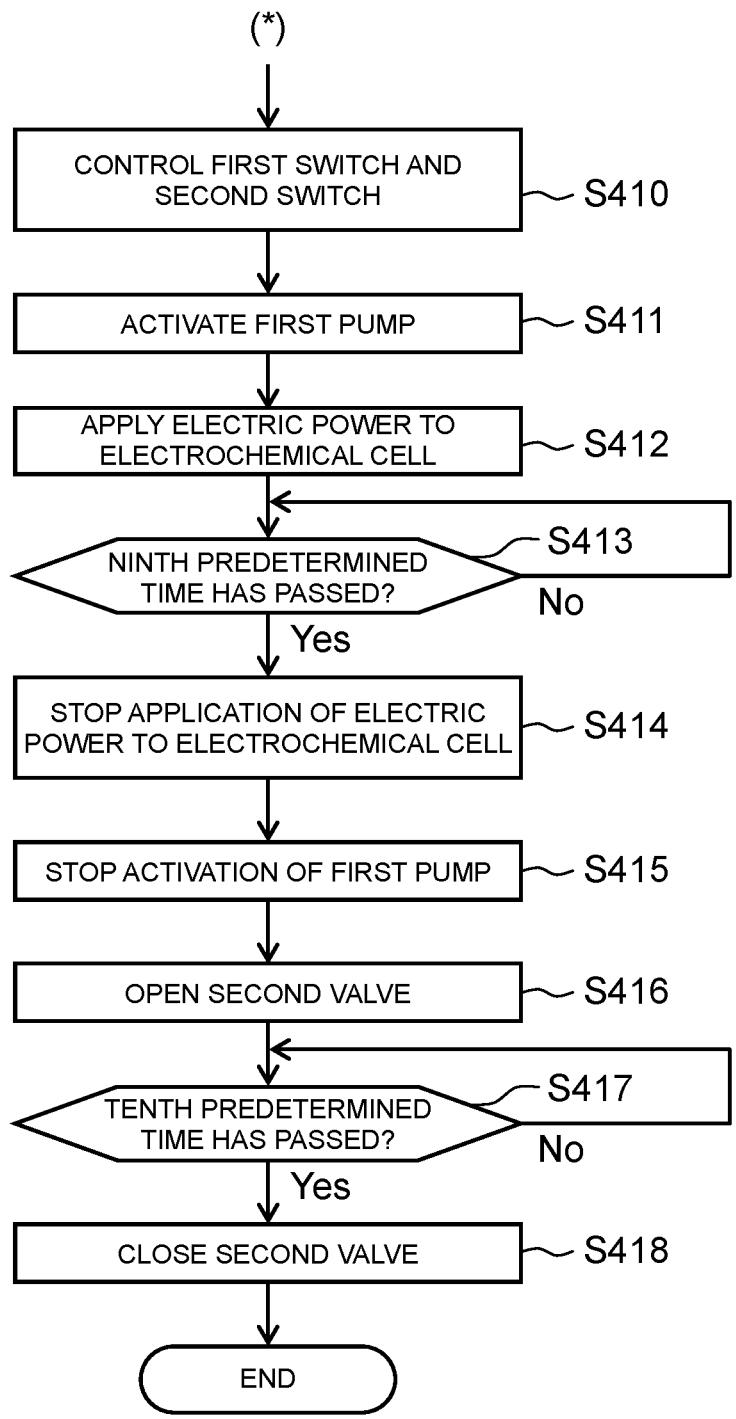

41

41A

ELECTROCHEMICAL CELL, WATER TREATMENT DEVICE PROVIDED WITH SAME, AND OPERATING METHOD FOR WATER TREATMENT DEVICE

TECHNICAL FIELD

The present disclosure relates to an electrochemical cell, a water treatment device provided with the same, and an operating method for water treatment device.

BACKGROUND ART

The water treatment device removes impurities in water by adsorbing and removing cations or anions by ion exchange resin. In the water treatment device, a bipolar membrane may be used in which a cation exchange group is disposed in one surface, and an anion exchange group is disposed in another surface (e.g., refer to PTL 1).

As the above-described bipolar membrane of the water treatment device, a textured membrane in which peaks and bottoms are arranged at intervals has been known (e.g., refer to PTL 1).

FIG. 13 is a schematic view showing a schematic configuration of the textured membrane disclosed in PTL 1.

As shown in FIG. 13, textured membrane 205 disclosed in PTL 1 has cation exchange layer 201 and anion exchange layer 202 adjacent to cation exchange layer 201, and peaks 203 and bottoms 204 are arranged at intervals. Since a surface area of the membrane is increased by peaks 203 and bottoms 204 formed in this textured membrane 205, when water containing a hardness component is supplied to textured membrane 205, an adsorption speed of the hardness component can be increased. Moreover, in peaks 203 and bottoms 204 of textured membrane 205, if a plurality of textured membranes 205 are used, a passage of treated water is formed as indicated by arrow 206 between each of peaks 203 and each of bottoms 204, so that a pressure loss can be kept low.

Moreover, in PTL 1, there has been disclosed an electrochemical cell in which electrode 207 and electrode 208 are disposed on both sides of textured membrane 205. In the electrochemical cell disclosed in PTL 1, a voltage is applied to both the electrodes in the presence of water, and the water is disassociated at interface 209 between cation exchange layer 201 and anion exchange layer 202 to generate $H^+$ and $OH^-$. These $H^+$ and $OH^-$ are substituted with cations and anions adsorbed by cation exchange layer 201 and anion exchange layer 202, which allows cation exchange layer 201 and anion exchange layer 202 to be reproduced. Therefore, in the electrochemical cell disclosed in PTL 1, the reproduction need not be performed, using a chemical agent as in the related art.

Moreover, there has been known a device including a variable voltage supply source capable of maintaining electrodes at a plurality of voltage levels during an ion exchange stage (e.g., refer to PTL 2). In the device disclosed in PTL 2, by maintaining the electrodes at the plurality of voltage levels, an ion concentration of a flowing-out solution flowing out from the device can be controlled.

However, even the water treatment device using textured membrane 205 disclosed in PTL 1 has had room for improvement in view of uniformization of flow of the water inside the device. Moreover, in the device disclosed in PTL 2, when the bipolar membrane is reproduced, there has been room for improvement in view of suppression of formation of scale.

CITATION LIST

Patent Literatures

PTL 1: Japanese Translation of PCT International Application Publication No. 2008-507406
PTL 2: Japanese Translation of PCT International Application Publication No. 2007-501702

SUMMARY OF THE INVENTION

An object of the present disclosure is to provide an electrochemical cell, a water treatment device provided with the same, and an operating method for water treatment device capable of solving at least one of the problems in the water treatment device using textured membrane 205 disclosed in PTL 1, and the problem in the device disclosed in PTL 2.

In order to solve the above-described conventional problems, an electrochemical cell according to the present disclosure includes a casing provided with an inflow port of water in a lower portion, and an outflow port of the water in an upper portion, a bipolar membrane laminated body in which two or more bipolar membranes are laminated so as to be opposed, electrodes disposed such that an anode and a cathode are opposed to sandwich the bipolar membrane laminated body, and a first diffusion member disposed between the inflow port and the bipolar membrane laminated body, and provided with through holes communicating between the inflow port and the bipolar membrane laminated body. Each of the through holes are formed such that an opening area of the through hole becomes larger as it becomes farther from a portion opposed to the inflow port.

This can uniformize the flow of the water inside the electrochemical cell. Moreover, since the water can uniformly flow inside the electrochemical cell, water treatment can be efficiently executed.

Moreover, a water treatment device according to the present disclosure includes an electrochemical cell, a water storage tank that stores water subjected to water softening treatment by the electrochemical cell, a first water channel connected to an inflow port, a second water channel that connects an outflow port and the water storage tank, a connection channel that connects the second water channel and the first water channel, a channel switch that switches a flow destination of water flowing in the second water channel to the water storage tank or the connection channel, and a pump provided in the connection channel.

This can decrease a hardness of water supplied to an inside of the electrochemical cell, and can suppress formation of scale during reproduction of the bipolar membranes.

Moreover, in an operating method for water treatment device according to the present disclosure, a water treatment device includes an electrochemical cell having a casing provided with an inflow port of water in a lower portion, and an outflow port of the water in an upper portion, a bipolar membrane laminated body in which two or more bipolar membranes are laminated so as to be opposed, electrodes disposed such that an anode and a cathode are opposed to sandwich the bipolar membrane laminated body, a water storage tank that stores water subjected to water softening treatment by the electrochemical cell, a first water channel connected to the inflow port, a second water channel that connects the outflow port and the water storage tank, a connection channel that connects the second water channel and the first water channel, a channel switch that switches a flow destination of water flowing in the second water channel to the water storage tank or the connection channel, and a pump provided in the connection channel. Furthermore, the operating method for water treatment device includes a step in which the channel switch switches a flow destination of the water flowing in the second water channel to the connection channel (step A), and a step in which the pump is activated (step B).

This can decrease the hardness of the water supplied to the inside of the electrochemical cell, and can suppress the formation of scale during the reproduction of the bipolar membranes.

The above-described purpose, other purposes, features, and advantages of the present disclosure will be clarified from detailed description of the following preferred exemplary embodiments with reference to the accompanying drawings.

According to an electrochemical cell, a water treatment device provided with the same, and an operating method for water treatment device according to the present disclosure, uniformization of a flow of water inside the electrochemical cell can be achieved, or during reproduction of bipolar membranes, a hardness of water supplied to an inside of the electrochemical cell can be decreased, and formation of scale can be suppressed.

BRIEF DESCRIPTION OF DRAWINGS

FIG. 6B is a flowchart showing respective operations of the reproduction treatment of the water treatment device according to the present second exemplary embodiment.

DESCRIPTION OF EMBODIMENTS

Hereinafter, exemplary embodiments of the present disclosure will be described with reference to the drawings. In all the drawings, the same or corresponding parts are given the same reference marks, and redundant description may be omitted. Moreover, in all the drawings, components necessary for describing the present disclosure are excerpted and illustrated, and illustration of other components may be omitted. Furthermore, the following exemplary embodiments do not limit the present disclosure.

First Exemplary Embodiment

A water treatment device according to the present first exemplary embodiment includes an electrochemical cell having a casing provided with an inflow port of water in a lower portion, and an outflow port of the water in an upper portion, a bipolar membrane laminated body in which two or more bipolar membranes are laminated so as to be opposed, and electrodes disposed such that an anode and a cathode are opposed to sandwich the bipolar membrane laminated body, a first water channel connected to the inflow port, a second water channel that connects the outflow port and a supply port to which water subjected to water softening treatment by the electrochemical cell is supplied, a connection channel that connects the second water channel and the first water channel, a channel switch that switches a flow destination of water flowing in the second water channel to the supply port or the connection channel, and a pump provided in the connection channel.

Moreover, the water treatment device according to the present first exemplary embodiment may further include a controller that controls the channel switch such that the flow destination of the water flowing in the second water channel becomes the connection channel, and activates the pump, when the bipolar membranes are reproduced.

Furthermore, the water treatment device according to the present first exemplary embodiment may further include a scale suppressant feeder that supplies a scale suppressant to the connection channel.

Hereinafter, one example of the water treatment device according to the present first exemplary embodiment will be described with reference to FIGS. 1 to 3.

[Configuration of Water Treatment Device]

Figure 1:
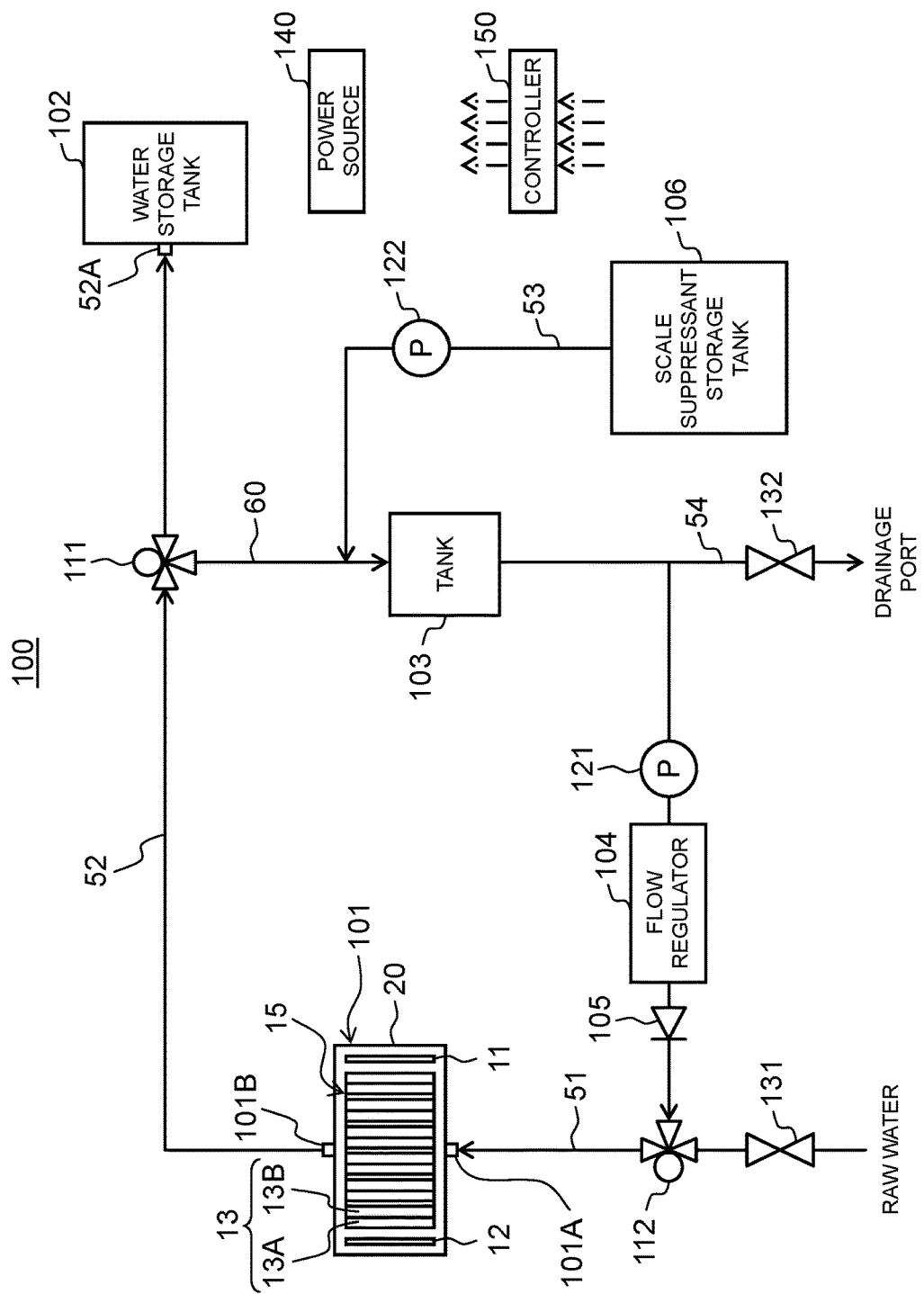
FIG. 1 is a schematic view showing a schematic configuration of a water treatment device according to the present first exemplary embodiment.

FIG. 1 is a schematic view showing a schematic configuration of the water treatment device according to the present first exemplary embodiment.

As shown in FIG. 1, water treatment device 100 according to the present first exemplary embodiment includes electrochemical cell 101 having bipolar membrane 13, first water channel 51, second water channel 52, connection channel 60 that connects second water channel 52 and first water channel 51, first channel switch 111, first pump 121, and controller 150. Controller 150 is configured to control first channel switch 111 such that a flow destination of water flowing in second water channel 52 becomes connection channel 60, and to activate first pump 121, when bipolar membranes 13 are reproduced.

Electrochemical cell 101 includes electrode 11, electrode 12, and bipolar membrane laminated body 15 inside casing 20. Specifically, anode 11 and cathode 12 are disposed so as to sandwich bipolar membrane laminated body 15.

Bipolar membrane laminated body 15 is configured to have two or more bipolar membranes 13 and to laminate bipolar membranes 13 such that main surfaces of bipolar membranes 13 are opposed to each other. Bipolar membranes 13 each have anion exchange group (anion exchange resin) 13A and cation exchange group (cation exchange resin) 13B.

At one end portion of casing 20, inflow port 101A is provided, and at another end portion of casing 20, outflow port 101B is provided. For electrochemical cell 101, a publicly known electrochemical cell can be used, and detailed description of a configuration will be omitted.

To inflow port 101A of electrochemical cell 101 is connected a downstream end of first water channel 51. In the middle of first water channel 51, first valve 131 is provided. For first valve 131, various types of valves such as an on-off valve, a flow regulating valve and the like can be used. Moreover, between a portion where first valve 131 of first water channel 51 is provided and the downstream end, second channel switch 112 is provided.

Second channel switch 112 is configured to switch a supply source of water to be supplied to the downstream end (inflow port 101A) of first water channel 51 to an upstream end of first water channel 51 or connection channel 60. In the present first exemplary embodiment, as second channel switch 112, a three-way valve is used.

Second channel switch 112 may have any aspect, as long as it can switch, to the upstream end of first water channel 51 or connection channel 60, the supply source of the water to be supplied to the downstream end (inflow port 101A) of first water channel 51 (tap water or the like; hereinafter, may be referred to as raw water). For example, an aspect may be such that second channel switch 112 is configured of two-way valves provided in respective channels on an upstream side and on a downstream side with respect to a connection portion to connection channel 60 in first water channel 51, and a two-way valve provided in connection channel 60.

To outflow port 101B of electrochemical cell 101 is connected an upstream end of second water channel 52, and a downstream end of second water channel 52 configures supply port 52A. In the present first exemplary embodiment, supply port 52A functions as a connection port of water storage tank 102 configured to store water subjected to water softening treatment in electrochemical cell 101 (hereinafter, referred to as soft water), and the soft water stored in water storage tank 102 is supplied to a user of water treatment device 100.

In the middle of second water channel 52, first channel switch 111 is provided. First channel switch 111 is configured to switch a supply destination of the water flowing in second water channel 52 to water storage tank 102 or connection channel 60. In the present first exemplary embodiment, as first channel switch 111, a three-way valve is used.

First channel switch 111 may have any aspect, as long as it can switch a supply destination of the water flowing in second water channel 52 to water storage tank 102 or connection channel 60. For example, an aspect may be such that first channel switch 111 is configured of two-way valves provided in respective channels on an upstream side and a downstream side with respect to a connection portion to connection channel 60 in second water channel 52, and a two-way valve provided in connection channel 60.

In the middle of connection channel 60, tank 103, first pump 121, flow regulator 104, and check valve 105 are provided in this order. Tank 103 is configured to store the soft water to be supplied to electrochemical cell 101 when reproduction treatment of electrochemical cell 101 is performed. The soft water stored in tank 103 may be supplied to water storage tank 102.

First pump 121 is configured to supply the soft water inside connection channel 60 or tank 103 to first water channel 51. Moreover, flow regulator 104 may have any aspect, as long as it can adjust a flow rate of the soft water flowing in connection channel 60, and for example, may be configured of a flow regulating valve. Check valve 105 is configured to prevent the soft water inside connection channel 60 from flowing back. In the case where first pump 121 has a function of adjusting the flow rate of the soft water flowing in connection channel 60, flow regulator 104 need not be provided.

Moreover, to a channel on the upstream side with respect to a portion where tank 103 is provided in connection channel 60 is connected a downstream end of third water channel 53. An upstream end of third water channel 53 is connected to scale suppressant storage tank 106. Moreover, in the middle of third water channel 53, second pump 122 is provided.

Inside scale suppressant storage tank 106, a scale suppressant is adjusted to have a first predetermined concentration (e.g., 500 ppm to 2000 ppm). As the scale suppressant, for example, polyphosphate or citric acid may be used.

When as the scale suppressant, polyphosphate is used, $CaCo_3$ (scale) can be restrained from being deposited inside electrochemical cell 101, connection channel 60, first pump 121, flow regulator 104, check valve 105, second channel switch 112, first water channel 51, second water channel 52, or first channel switch 111.

When polyphosphate is used, a form may be employed in which a container filled with the polyphosphate and having water permeability is disposed inside scale suppressant storage tank 106. Moreover, a polymerization degree of polyphosphoric acid may be 2 or more in view of suppression of hydrolysis of polyphosphoric acid and increase in stability of the scale suppressant.

Moreover, when as the scale suppressant, citric acid is used, even if scale is deposited inside electrochemical cell 101 or the like, the scale can be removed and adhesion of the scale can be suppressed.

Second pump 122 is configured to supply an aqueous solution inside scale suppressant storage tank 106 from third water channel 53 to connection channel 60 and tank 103, the aqueous solution having the scale suppressant dissolved. Second pump 122 is configured to adjust a flow rate of the aqueous solution flowing in third water channel 53 such that a concentration of the scale suppressant supplied to connection channel 60 and tank 103 has a second predetermined concentration (e.g., 1 ppm to 50 ppm).

Near a portion where third water channel 53 is connected to connection channel 60, a buffer for promoting mixing of the soft water flowing in connection channel 60, and the aqueous solution supplied from third water channel 53 may be provided. The buffer may be configured of a pipe having a larger diameter than a diameter of a pipe configuring connection channel 60 or may be configured of a smaller tank than tank 103.

Furthermore, to a channel on the upstream side with respect to a portion where first pump 121 is provided in connection channel 60 is connected an upstream end of drainage channel 54. A downstream end of drainage channel 54 configures a drainage port. Moreover, in the middle of drainage channel 54, second valve 132 is provided. Second valve 132 may be configured of, for example, an on-off valve.

Power source 140 may have any form, as long as it can supply electric power to electrochemical cell 101, and for example, may be configured by changing an alternating current voltage supplied from an alternating current power source such as a commercial power source and the like to a direct current voltage by an AC/DC converter, or may be configured of a direct current power source such as a secondary battery and the like.

Controller 150 is configured to control respective instruments configuring water treatment device 100 such as power source 140, flow regulator 104 and the like. Controller 150 includes an arithmetic operation processor for which a microprocessor, a CPU or the like is exemplified, a storage that stores programs for executing respective control operations, and is configured of a memory or the like, and a clock having a calendar function (none of them is shown). Controller 150 performs various types of control regarding water treatment device 100 by the arithmetic operation processor reading a predetermined control program stored in the storage, and executes this.

Controller 150 may have not only a form of being configured of a single controller, but a form of being configured of a controller group in which a plurality of controllers cooperate and execute the control of water treatment device 100. Moreover, controller 150 may be configured of a micro control, or may be a micro processing unit (MPU), a programmable logic controller (PLC), a logical circuit or the like.

[Operation, and Actions and Effects of Water Treatment Device]

Next, operation of water treatment device 100 according to the present first exemplary embodiment will be described with reference to FIGS. 1 to 3.

First, the water softening treatment by water treatment device 100 will be described with reference to FIGS. 1 and 2.

Figure 2:
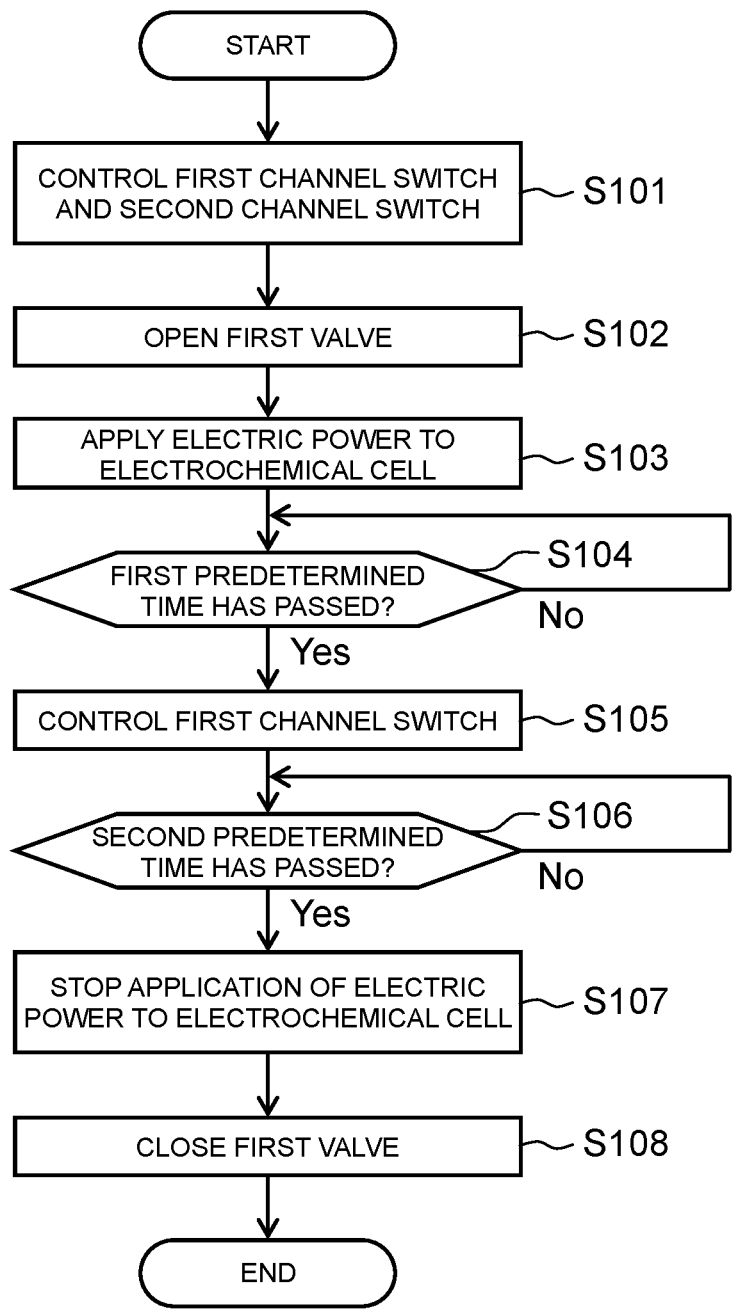
FIG. 2 is a flowchart showing respective operations of water softening treatment of the water treatment device according to the present first exemplary embodiment.

FIG. 2 is a flowchart showing respective operations of the water softening treatment of the water treatment device according to the present first exemplary embodiment.

As shown in FIG. 2, controller 150 controls first channel switch 111 and second channel switch 112 (step S101). Specifically, controller 150 controls first channel switch 111 such that the supply destination of the water flowing in second water channel 52 becomes water storage tank 102, and controls second channel switch 112 such that the supply source of the water to be supplied to the downstream end of first water channel 51 becomes the upstream end of first water channel 51.

Next, controller 150 opens first valve 131 (step S102). This allows the raw water to be supplied from first water channel 51 to electrochemical cell 101.

Next, controller 150 controls power source 140 such that predetermined electric power is applied to electrode 11 and electrode 12 of electrochemical cell 101 (step S103). Controller 150 causes power source 140 to apply a voltage such that electrode 11 opposed to cation exchange group 13B becomes an anode and electrode 12 opposed to anion exchange group 13A becomes a cathode. At this time, controller 150 may control power source 140 such that a voltage of 0 V to 500 V is applied. Moreover, the voltage applied by power source 140 is appropriately set in accordance with a number of bipolar membranes 13 arranged inside casing 20, a hardness of the raw water, and the like.

This allows a hardness component (cations) such as a calcium component and the like in the raw water supplied to electrochemical cell 101 to be adsorbed and removed by cation exchange groups 13B existing inside bipolar membranes 13. Moreover, the anions such as chloride ions in the raw water are adsorbed and removed by anion exchange groups 13A. The raw water (soft water) subjected to the water softening treatment by electrochemical cell 101 flows in second water channel 52, and is stored in water storage tank 102 from supply port 52A.

Next, controller 150 determines whether or not a first predetermined time has passed since the application of the voltage in step S103 (step S104). Here, the first predetermined time is a time required for storing a predetermined volume of soft water in water storage tank 102. The first predetermined time may be appropriately calculated from a volume of water storage tank 102, a flow rate of the water flowing in first water channel 51 or the like, and a volume of casing 20 of electrochemical cell 101, and the like, or may be beforehand found by an experiment.

If controller 150 determines that the first predetermined time has passed (Yes in step S104), controller 150 advances to step S105. The configuration may be such that controller 150 executes the following operation in place of step S104. That is, the configuration may be such that a water level detector is disposed inside water storage tank 102, and that when the water level detector senses a predetermined water level, controller 150 advances to step S105.

In step S105, controller 150 controls first channel switch 111 such that the supply destination of the water flowing in second water channel 52 becomes connection channel 60. Thereby, the raw water (soft water) subjected to the water softening treatment in electrochemical cell 101 is supplied to connection channel 60 from second water channel 52, and is stored in tank 103.

At the same time as, or after the control of first channel switch 111 in step S105, controller 150 may activate second pump 122 to supply the scale suppressant to connection channel 60 and to mix the scale suppressant with the soft water inside tank 103. In this case, controller 150 may control an activation time of second pump 122 or the like such that the concentration of the scale suppressant inside connection channel 60 or in tank 103 becomes the second predetermined concentration.

Next, controller 150 determines whether or not a second predetermined time has passed since the control of first channel switch 111 in step S105, (step S106). Here, the second predetermined time is a time required for storing a predetermined volume of soft water in tank 103. The second predetermined time may be appropriately calculated from a volume of tank 103, the flow rate of the water flowing in first water channel 51 or the like, the volume of casing 20 of electrochemical cell 101, and the like, or may be beforehand found by an experiment.

If controller 150 determines that the second predetermined time has passed (Yes in step S106), controller 150 advances to step S107. The configuration may be such that controller 150 executes the following operation in place of step S106. That is, the configuration may be such that a water level detector is disposed inside tank 103, and that when the water level detector senses a predetermined water level, controller 150 advances to step S107.

In step S107, controller 150 controls power source 140 such that the predetermined electric power applied to electrode 11 and electrode 12 of electrochemical cell 101 stops. Subsequently, controller 150 closes first valve 131 (step S108) to stop the supply of the raw water to electrochemical cell 101, and ends the present program.

Next, reproduction treatment of water treatment device 100 according to the present first exemplary embodiment will be described with reference to FIGS. 1 and 3.

Figure 3:
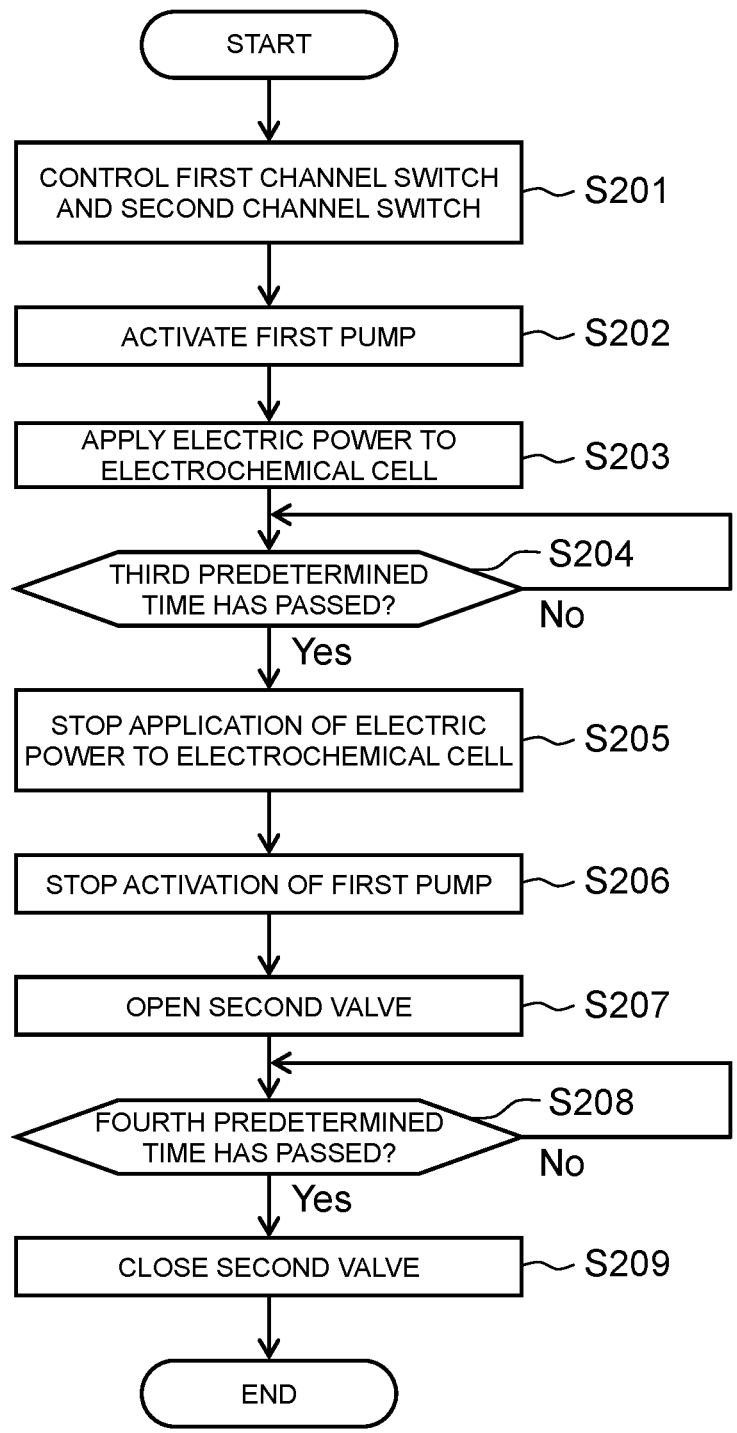
FIG. 3 is a flowchart showing one example of a bipolar membrane of an electrochemical cell according to the present first exemplary embodiment.

FIG. 3 is a flowchart showing respective operations of the reproduction treatment of the water treatment device according to the present first exemplary embodiment.

As shown in FIG. 3, controller 150 controls first channel switch 111 and second channel switch 112 (step S201). Specifically, controller 150 controls first channel switch 111 such that the supply destination of the water flowing in second water channel 52 becomes an upstream end of connection channel 60, and controls second channel switch 112 such that the supply source of the water to be supplied to the downstream end of first water channel 51 becomes a downstream end of connection channel 60.

Next, controller 150 activates first pump 121 (step S202). This allows the soft water inside connection channel 60 and tank 103 to be supplied to electrochemical cell 101 through first water channel 51. If the scale suppressant is not beforehand mixed into tank 103, or if the concentration of the scale suppressant has not reached the second predetermined concentration, at the same time as, or after the activation of first pump 121, controller 150 may activate second pump 122 to supply the scale suppressant to connection channel 60 and tank 103.

Next, controller 150 controls power source 140 such that predetermined electric power is applied to electrode 11 and electrode 12 of electrochemical cell 101 (step S203). Controller 150 causes power source 140 to apply the voltage such that electrode 11 becomes a cathode, and electrode 12 becomes an anode, which is opposite to those in the water softening treatment.

At this time, controller 150 may control power source 140 such that a voltage of 10 V to 500 V is applied. Moreover, the voltage applied by power source 140 is appropriately set in accordance with the number of bipolar membranes 13 arranged inside casing 20, the hardness of the raw water, and the like.

This generates a potential difference in each of bipolar membranes 13, and at an interface formed by cation exchange group 13B and anion exchange group 13A of each of bipolar membranes 13, water is disassociated to generate hydrogen ions on a side of cation exchange group 13B and hydroxide ions on a side of anion exchange group 13A.

The hardness component (cations) such as calcium ions and magnesium ions adsorbed by cation exchange group 13B is desorbed by being ion-exchanged with the generated hydrogen ions to thereby reproduce cation exchange group 13B. Moreover, the anions such as chloride ions and the like adsorbed by anion exchange group 13A are disassociated by being ion-exchanged with the generated hydroxide ions to thereby reproduce anion exchange group 13A.

At the same time as, or after the control of power source 140 in step S203, controller 150 may control flow regulator 104 such that a flow rate of the soft water flowing into electrochemical cell 101 becomes a predetermined flow rate.

Moreover, a pressure gauge may be provided in first water channel 51 or second water channel 52, and controller 150 may control flow regulator 104 such that a pressure inside first water channel 51 or second water channel 52 becomes a predetermined pressure.

Furthermore, a conductivity meter may be provided in first water channel 51 or second water channel 52, and controller 150 may control flow regulator 104 or power source 140 such that a conductivity of the water following in first water channel 51 or second water channel 52 becomes a predetermined conductivity.

Next, controller 150 determines whether or not a third predetermined time has passed since the application of the voltage in step S203 (step S204). Here, the third predetermined time is a time required for sufficiently reproducing bipolar membranes 13 inside electrochemical cell 101. The third predetermined time is appropriately set in accordance with the number of bipolar membranes 13 arranged inside casing 20, the hardness of the raw water, and the like.

If controller 150 determines that the third predetermined time has passed (Yes in step S204), controller 150 controls power source 140 to stop the supply of the electric power applied to electrode 11 and electrode 12 of electrochemical cell 101 (step S205), and stops the activation of first pump 121 (step S206).

Next, controller 150 opens second valve 132 (step S207). This allows the water inside connection channel 60, tank 103, first water channel 51, electrochemical cell 101, second water channel 52 and the like to be discharged to an outside of water treatment device 100 from the drainage port through drainage channel 54.

Next, controller 150 determines whether or not a fourth predetermined time has passed since the opening of second valve 132 in step S206 (step S208). Here, the fourth predetermined time is a time required for discharging the water inside electrochemical cell 101 and the like to the outside of water treatment device 100 from the drainage port. The fourth predetermined time is appropriately set, based on a volume of electrochemical cell 101, a volume of tank 103, volumes of pipes configuring first water channel 51 and second water channel 52, and the like.

If controller 150 determines that the fourth predetermined time has passed (Yes in step S208), controller 150 closes second valve 132 (step S209) and ends the present program.

A form may be employed in which a float switch is provided inside tank 103 to open second valve 132 by the float switch. Moreover, a form may be employed in which when the water inside tank 103 reaches a predetermined water level by the float switch provided inside tank 103, second valve 132 is closed by the float switch.

In this case, when second valve 132 is opened by the float switch, after executing the processing in step S206, controller 150 ends the program, and when second valve 132 is not opened by the float switch, after executing the processing in step S207, controller 150 ends the program.

In water treatment device 100 configured in this manner according to the present first exemplary embodiment, during the reproduction treatment of bipolar membranes 13, supplying the soft water to electrochemical cell 101 can decrease the hardness of the water, as compared with a case where the reproduction treatment of bipolar membranes 13 is performed, using the raw water. This can suppress the formation of the scale inside electrochemical cell 101 and the like, as compared with the case where the reproduction treatment of bipolar membranes 13 is performed, using the raw water.

In water treatment device 100 according to the present first exemplary embodiment, during the reproduction treatment of bipolar membranes 13, a circulation path is configured of first water channel 51, second water channel 52, and connection channel 60 to circulate the soft water stored inside tank 103, which can increase a flow velocity passing the electrochemical cell during the reproduction even in the case of a small amount of reproduction water.

Accordingly, the calcium ions and the hydroxide ions generated from bipolar membranes 13 are diffused, so that a rapid rise of the concentrations of these ions near bipolar membranes 13 can be suppressed. This can suppress the formation of scale.

In water treatment device 100 according to the present first exemplary embodiment, by supplying the scale suppressant to connection channel 60 and the like before or during the reproduction treatment of bipolar membranes 13, the formation of the scale can be more suppressed in electrochemical cell 101 and the like.

Second Exemplary Embodiment

A water treatment device according to the present second exemplary embodiment further includes a first tank, a second tank, a first switch, and a second switch provided in a connection channel. The connection channel has a first connection channel one end of which is connected to a second water channel, a second connection channel one end of which is connected a first water channel, a first bifurcating channel that connects the other end of the first connection channel and the first tank, a second bifurcating channel that connects the other end of the first connection channel and the second tank, a first confluence channel that connects the first tank and the other end of the second connection channel, and a second confluence channel that connects the second tank and the other end of the second connection channel. The first switch is configured to switch a flow destination of water flowing in the first connection channel to the first tank or the second tank. The second switch is configured to switch a supply source of water to be supplied to the second connection channel to the first tank or the second tank.

Moreover, in the water treatment device according the present second exemplary embodiment, a controller controls a channel switch such that a flow destination of water flowing in the second water channel becomes the connection channel, when bipolar membranes are reproduced. Moreover, the controller controls the first switch such that the flow destination of the water flowing in the first connection channel becomes the first tank, controls the second switch such that the supply source of the water to be supplied to the second connection channel becomes the first tank, and activates a pump. Moreover, the controller may control the first switch such that the flow destination of the water flowing in the first connection channel becomes the second tank, control the second switch such that the supply source of the water to be supplied to the second connection channel becomes the second tank, and activate the pump.

Furthermore, in the water treatment device according to the present second exemplary embodiment, a configuration may be such that a volume of the second tank is larger than a volume of the first tank.

Hereinafter, one example of the water treatment device according to the present second exemplary embodiment will be described with reference to FIGS. 4 to 6.

[Configuration of Water Treatment Device]

Figure 4:
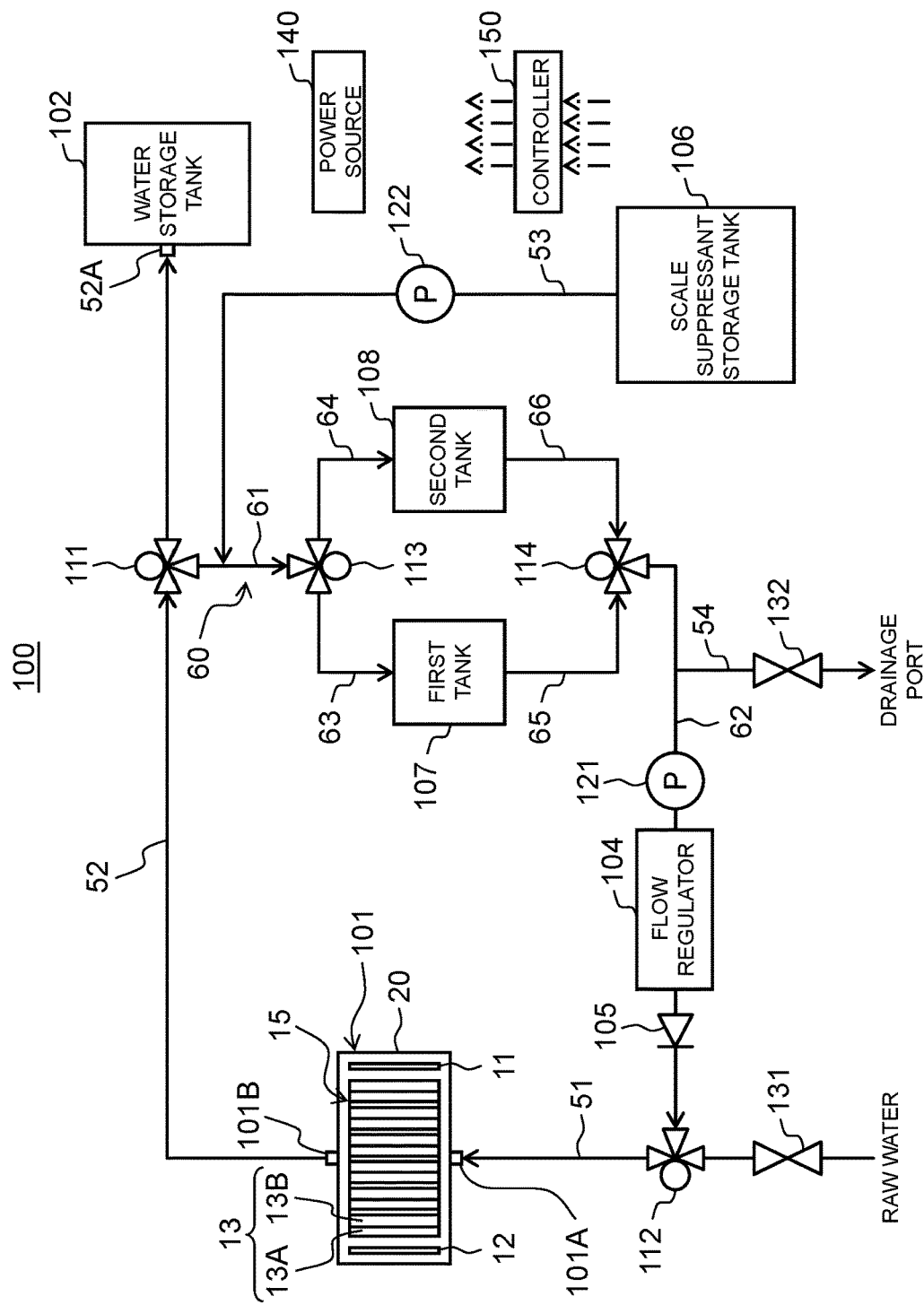
FIG. 4 is a schematic view showing a schematic configuration of a water treatment device according to the present second exemplary embodiment.

FIG. 4 is a schematic view showing a schematic configuration of the water treatment device according to the present second exemplary embodiment.

As shown in FIG. 4, while water processing device 100 according the present second exemplary embodiment basically has the same configuration as water treatment device 100 according to the first exemplary embodiment, it is different in a configuration of connection channel 60 and in that there are two tanks provided in connection channel 60.

Specifically, connection channel 60 has first connection channel 61, second connection channel 62, first bifurcating channel 63, second bifurcating channel 64, first confluence channel 65, and second confluence channel 66. Moreover, in connection channel 60, two tanks (first tank 107 and second tank 108) are provided in parallel.

In first connection channel 61, one end thereof is connected to second water channel 52 through first channel switch 111, and the other end thereof is connected to one end of first bifurcating channel 63 or second bifurcating channel 64 through first switch 113. In second connection channel 62, one end thereof is connected to first water channel 51 through second channel switch 112, and the other end thereof is connected to the other end of first confluence channel 65 or second confluence channel 66 through second switch 114.

First bifurcating channel 63 connects the other end of first connection channel 61 and first tank 107 through first switch 113. Second bifurcating channel 64 connects the other end of first connection channel 61 and second tank 108 through first switch 113.

First switch 113 is configured to switch a supply destination of water flowing in first connection channel 61 to first bifurcating channel 63 or second bifurcating channel 64. In the present second exemplary embodiment, as first switch 113, a three-way valve is used.

First switch 113 may have any aspect, as long as it can switch a supply destination of the water flowing in first connection channel 61 to first bifurcating channel 63 or second bifurcating channel 64, and for example, may have an aspect of being configured of two-way valves respectively provided in first connection channel 61, first bifurcating channel 63, and second bifurcating channel 64.

First tank 107 and second tank 108 are configured to store the soft water to be supplied to electrochemical cell 101 when reproduction treatment of electrochemical cell 101 is performed. The soft water stored in first tank 107 or second tank 108 may be supplied to water storage tank 102.

While in the present second exemplary embodiment, first tank 107 and second tank 108 are configured such that a volume of second tank 108 is larger than a volume of first tank 107, the present disclosure is not limited thereto. First tank 107 and second tank 108 may be configured such that the volumes of first tank 107 and second tank 108 are the same, or may be configured such that the volume of first tank 107 is larger than the volume of second tank 108.

First confluence channel 65 connects first tank 107 and one end of second connection channel 62 through second switch 114. Second confluence channel 66 connects second tank 108 and one end of second confluence channel 66 through second switch 114.

Second switch 114 is configured to switch, to first confluence channel 65 (first tank 107) or second confluence channel 66 (second tank 108), a supply source of water to be supplied to second connection channel 62. In the present second exemplary embodiment, as second switch 114, a three-way valve is used.

Second switch 114 may have any aspect, as long as it can switch, to first confluence channel 65 or second confluence channel 66, the supply source of the water to be supplied to second connection channel 62, and for example, may have an aspect of two-way valves respectively provided in first confluence channel 65, second confluence channel 66, and second connection channel 62.

[Operation, and Actions and Effects of Water Treatment Device]

Next, an operation of water treatment device 100 according to the present second exemplary embodiment will be described with reference to FIGS. 4 to 6B.

First, the water softening treatment by water treatment device 100 will be described with reference to FIGS. 4 and 5.

Figure 5:
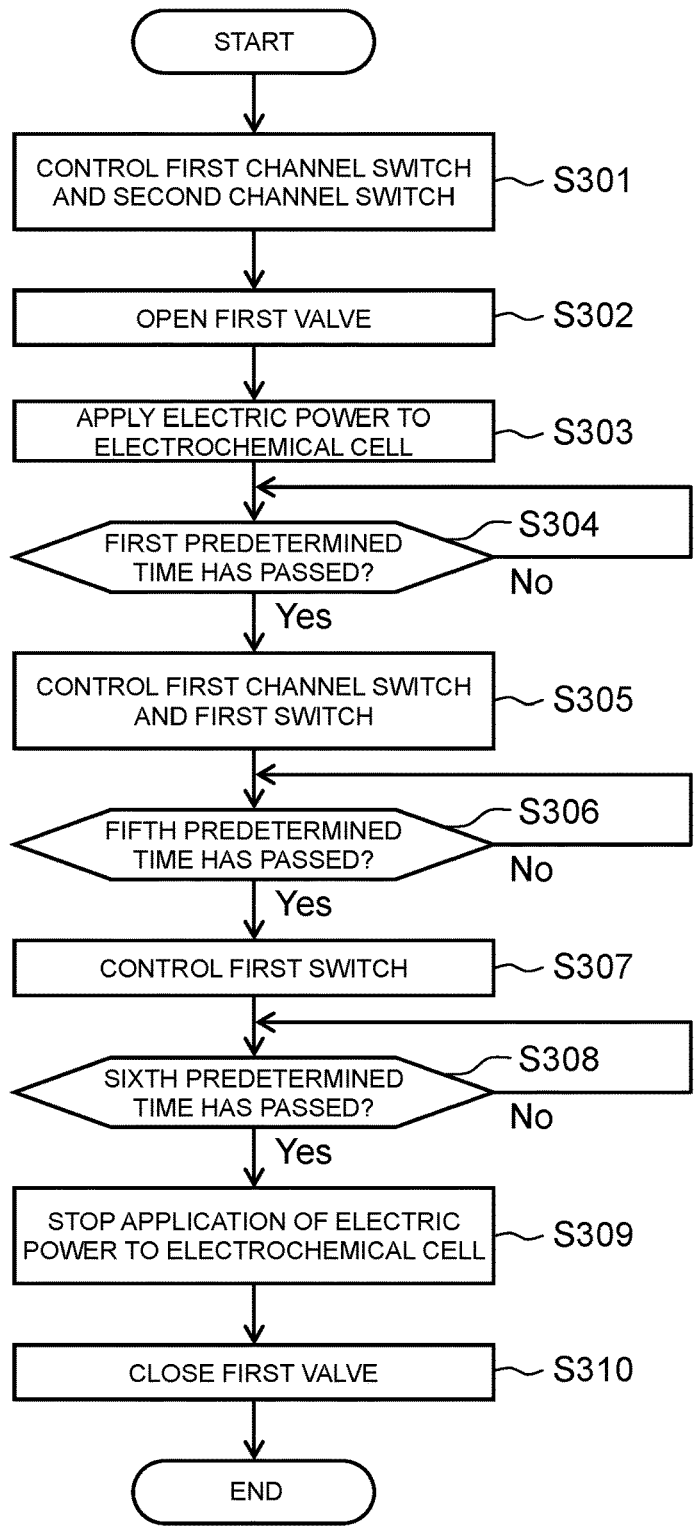
FIG. 5 is a flowchart showing respective operations of water softening treatment of a water treatment device according to the present second exemplary embodiment.

FIG. 5 is a flowchart showing respective operations of the water softening treatment of the water treatment device according to the present second exemplary embodiment.

As shown in FIG. 5, controller 150 controls first channel switch 111 and second channel switch 112 (step S301). Specifically, controller 150 controls first channel switch 111 such that a supply destination of the water flowing in second water channel 52 becomes water storage tank 102, and controls second channel switch 112 such that a supply source of the water to be supplied to a downstream end of first water channel 51 becomes an upstream end of first water channel 51.

Next, controller 150 opens first valve 131 (step S302). This allows raw water to be supplied from first water channel 51 to electrochemical cell 101.

Next, controller 150 controls power source 140 such that predetermined electric power is applied to electrode 11 and electrode 12 of electrochemical cell 101 (step S303). This allows a hardness component (cations) such as a magnesium component and the like in the raw water supplied to electrochemical cell 101 to be adsorbed and removed by cation exchange groups 13B existing inside bipolar membranes 13. Moreover, the anions such as chloride ions in the raw water are adsorbed and removed by anion exchange groups 13A. The raw water subjected to water softening treatment by electrochemical cell 101 (soft water) flows in second water channel 52, and is stored in water storage tank 102 from supply port 52A.

Next, controller 150 determines whether or not a first predetermined time has passed since the application of a voltage in step S303 (step S304). If controller 150 determines that the first predetermined time has passed (Yes in step S304), controller 150 advances to step S305. The configuration may be such that controller 150 executes the following operation in place of step S304. That is, the configuration may be such that a water level detector is disposed inside water storage tank 102, and that when the water level detector senses a predetermined water level, controller 150 advances to step S305.

In step S305, controller 150 controls first channel switch 111 and first switch 113. Specifically, controller 150 controls first channel switch 111 such that the supply destination of the water flowing in second water channel 52 becomes connection channel 60 (first connection channel 61). Moreover, controller 150 controls first switch 113 such that the supply destination of the water flowing in first connection channel 61 becomes first bifurcating channel 63.

This allows the raw water subjected to the water softening treatment by electrochemical cell 101 (soft water) to be supplied to first connection channel 61 from second water channel 52, and to be stored in first tank 107 through first bifurcating channel 63.

At the same time as, or after the control of first channel switch 111 and first switch 113 in step S305, controller 150 may activate second pump 122 to supply a scale suppressant to first connection channel 61 and to mix the scale suppressant with the soft water inside first tank 107. In this case, controller 150 may control an activation time or the like of second pump 122 such that a concentration of the scale suppressant inside connection channel 60 or inside first tank 107 becomes a second predetermined concentration.

Next, controller 150 determines whether or not a fifth predetermined time has passed since the control of first channel switch 111 and first switch 113 in step S305 (step S306). Here, the fifth predetermined time is a time required for storing a predetermined volume of soft water in first tank 107. The fifth predetermined time may be appropriately calculated from the volume of first tank 107, a flow rate of the water flowing in first water channel 51 or the like, a volume of casing 20 of electrochemical cell 101, and the like, or may be beforehand found by an experiment.

If controller 150 determines that the fifth predetermined time has passed (Yes in step S306), controller 150 advances to step S307. The configuration may be such that controller 150 executes the following operation in place of step S306. That is, the configuration may be such that a water level detector is disposed inside first tank 107, and that when the water level detector senses a predetermined water level, controller 150 advances to step S307.

Moreover, in step S307, controller 150 controls first switch 113 such that the supply destination of the water flowing in first connection channel 61 becomes second bifurcating channel 64.

This allows the raw water subjected to the water softening treatment by electrochemical cell 101 (soft water) to be stored in second tank 108 through second bifurcating channel 64.

At the same time as, or after the control of first switch 113 in step S307, controller 150 may activate second pump 122 to supply the scale suppressant to first connection channel 61 and to mix the scale suppressant with the soft water inside second tank 108. In this case, controller 150 may control an activation time or the like of second pump 122 such that a concentration of the scale suppressant inside connection channel 60 or second tank 108 becomes the second predetermined concentration.

Next, controller 150 determines whether or not a sixth predetermined time has passed since the control of first switch 113 in step S307 (step S308). Here, the sixth predetermined time is a time required for storing a predetermined volume of soft water in second tank 108. The sixth predetermined time may be appropriately calculated from the volume of second tank 108, the flow rate of the water flowing in first water channel 51 or the like, the volume of casing 20 of electrochemical cell 101, and the like, or may be beforehand found by an experiment.

If controller 150 determines that the sixth predetermined time has passed (Yes in step S308), controller 150 advances to step S309. The configuration may be such that controller 150 executes the following operation in place of step S308. That is, the configuration may be such that a water level detector is disposed inside second tank 108, and that when the water level detector senses a predetermined water level, controller 150 advances to step S309.

In step S309, controller 150 controls power source 140 such that the supply of the electric power applied to electrode 11 and electrode 12 of electrochemical cell 101 stops. Subsequently, controller 150 closes first valve 131 (step S310) to stop the supply of the raw water to electrochemical cell 101, and ends the present program.

Next, reproduction treatment of water treatment device 100 according to the present second exemplary embodiment will be described with reference to FIGS. 4, 6A, and 6B.

Figure 6A:
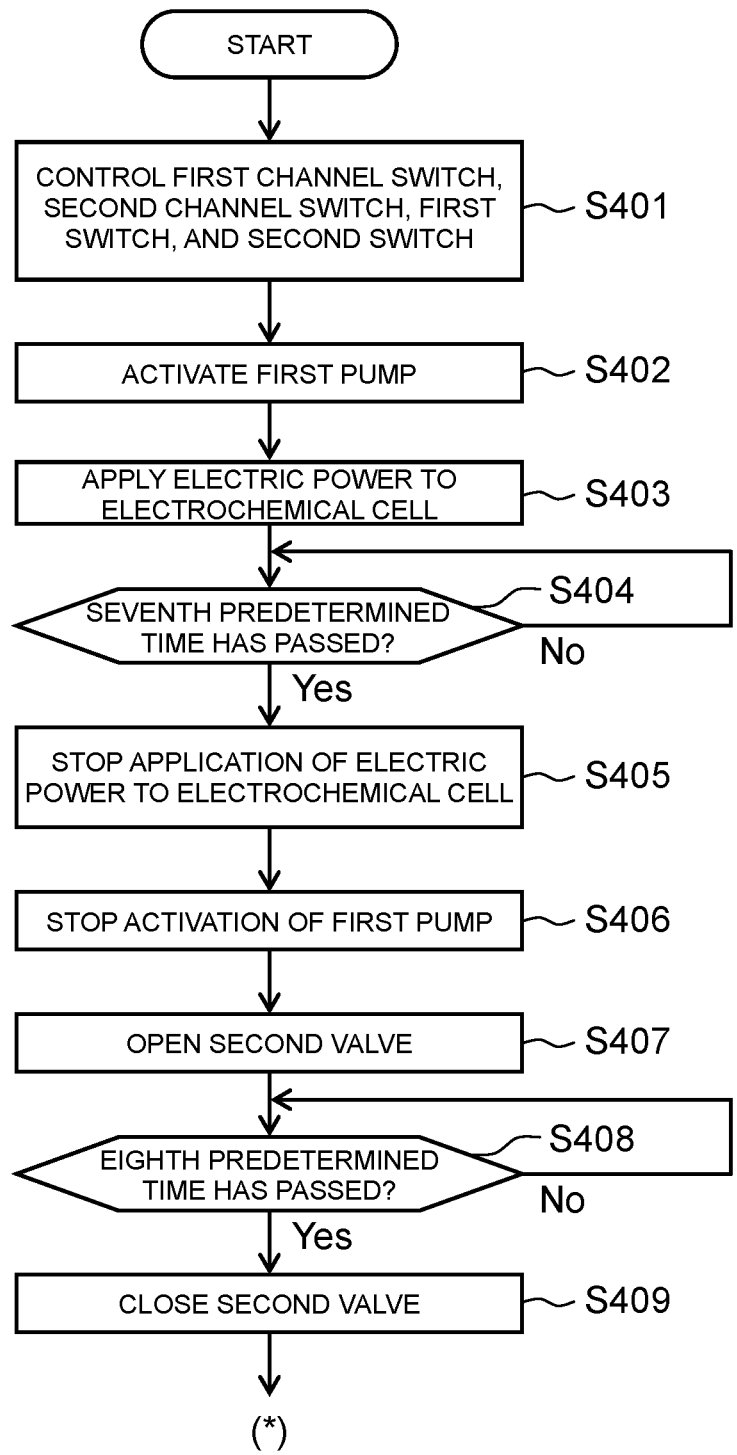
FIG. 6A is a flowchart showing respective operations of reproduction treatment of the water treatment device according to the present second exemplary embodiment.

FIGS. 6A and 6B are a flowchart showing respective operations of the reproduction treatment of the water treatment device according to the present second exemplary embodiment.

As shown in FIGS. 6A and 6B, controller 150 controls first channel switch 111, second channel switch 112, first switch 113, and second switch 114 (step S401).

Specifically, controller 150 controls first channel switch 111 such that the supply destination of the water flowing in second water channel 52 becomes an upstream end of connection channel 60, and controls second channel switch 112 such that the supply source of the water to be supplied to the downstream end of first water channel 51 becomes a downstream end of connection channel 60. Moreover, controller 150 controls first switch 113 such that the supply destination of the water flowing in first connection channel 61 becomes first bifurcating channel 63 (first tank 107), and controls second switch 114 such that the supply source of the water to be supplied to second connection channel 62 becomes first confluence channel 65 (first tank 107).

Next, controller 150 activates first pump 121 (step S402). This allows the soft water inside connection channel 60 and first tank 107 to be supplied to electrochemical cell 101 through first water channel 51. If the scale suppressant is not beforehand mixed inside first tank 107, or if the concentration of the scale suppressant has not reached the second predetermined concentration, at the same time as, or after the activation of first pump 121, controller 150 may activate second pump 122 to supply the scale suppressant to connection channel 60 and first tank 107.

Next, controller 150 controls power source 140 such that predetermined electric power is applied to electrode 11 and electrode 12 of electrochemical cell 101 (step S403). At this time, controller 150 may control power source 140 such that a voltage of 10 V to 500 V is applied. The voltage applied by power source 140 is appropriately set in accordance with a number of bipolar membranes 13 arranged inside casing 20, a hardness of the raw water, and the like.

This generates a potential difference in each of bipolar membranes 13, and at an interface formed by cation exchange group 13B and anion exchange group 13A of bipolar membrane 13, water is disassociated to generate hydrogen ions on a side of cation exchange group 13B and hydroxide ions on a side of anion exchange group 13A.

The hardness component (cations) such as calcium ions and magnesium ions adsorbed by cation exchange group 13B is desorbed by being ion-exchanged with the generated hydrogen ions to thereby reproduce cation exchange group 13B. Moreover, the anions such as chloride ions and the like adsorbed by anion exchange group 13A are disassociated by being ion-exchanged with the generated hydroxide ions to thereby reproduce anion exchange group 13A.

At the same time as, or after the control of power source 140 in step S403, controller 150 may control flow regulator 104 such that the flow rate of the soft water flowing into electrochemical cell 101 becomes a predetermined flow rate.

Moreover, a pressure gauge may be provided in first water channel 51 or second water channel 52, and controller 150 may control flow regulator 104 such that a pressure inside first water channel 51 or second water channel 52 becomes a predetermined pressure.

Furthermore, a conductivity meter may be provided in first water channel 51 or second water channel 52, and controller 150 may control flow regulator 104 or power source 140 such that a conductivity of the water flowing in first water channel 51 or second water channel 52 becomes a first conductivity.

Next, controller 150 determines whether or not a seventh predetermined time has passed since the application of the voltage in step S403 (step S404). Here, the seventh predetermined time is beforehand set by an experiment or the like in accordance with the number of bipolar membranes 13 arranged inside casing 20, the hardness of the raw water, and the like. The seventh predetermined time may be a time when the conductivity of the water flowing in first water channel 51 or second water channel 52 becomes a first conductivity.

If controller 150 determines that the seventh predetermined time has passed (Yes in step S404), controller 150 controls power source 140 to stop the supply of the electric power applied to electrode 11 and electrode 12 of electrochemical cell 101 (step S405), and stops the activation of first pump 121 (step S406).

Next, controller 150 opens second valve 132 (step S407). This allows the water inside first connection channel 61, second connection channel 62, first bifurcating channel 63, first confluence channel 65, first tank 107, first water channel 51, electrochemical cell 101, second water channel 52, and the like to be discharged to an outside of water treatment device 100 from a drainage port through drainage channel 54.

Next, controller 150 determines whether or not an eighth predetermined time has passed since the opening of second valve 132 in step S407 (step S408). Here, the eighth predetermined time is a time required for discharging the water inside electrochemical cell 101 and the like to the outside of water treatment device 100 from the drainage port. The eighth predetermined time is appropriately set, based on the volume of electrochemical cell 101, the volume of first tank 107, volumes of pipes configuring first water channel 51 and second water channel 52, and the like.

If controller 150 determines that the eighth predetermined time has passed (Yes in step S408), controller 150 closes second valve 132 (step S409).

A form may be employed in which a float switch is provided inside first tank 107 to open second valve 132 by the float switch. Moreover, a form may be employed in which when the water inside first tank 107 reaches a predetermined water level by the float switch provided inside first tank 107, second valve 132 is closed by the float switch.

Next, controller 150 controls first switch 113 such that the supply destination of the water flowing in first connection channel 61 becomes second bifurcating channel 64 (second tank 108), and controls second switch 114 such that the supply source of the water to be supplied to second connection channel 62 becomes second confluence channel 66 (second tank 108) (step S410).

Next, controller 150 activates first pump 121 (step S411). This allows the soft water inside connection channel 60 and second tank 108 to be supplied to electrochemical cell 101 through first water channel 51. If the scale suppressant is not beforehand mixed inside second tank 108, or if the concentration of the scale suppressant has not reached the second predetermined concentration, at the same time as, or after the activation of first pump 121, controller 150 may activate second pump 122 to supply the scale suppressant to connection channel 60 and second tank 108.

Next, controller 150 controls power source 140 such that the predetermined electric power is applied to electrode 11 and electrode 12 of electrochemical cell 101 (step S412). At this time, controller 150 may control power source 140 such that a voltage of 10 V to 500 V is applied. The voltage applied by power source 140 is appropriately set in accordance with a number of bipolar membranes 13 arranged inside casing 20, a hardness of the raw water, and the like.

This generates the potential difference in each of bipolar membranes 13, and at the interface formed by cation exchange group 13B and anion exchange group 13A of the bipolar membrane 13, water is disassociated to generate hydrogen ions on a side of cation exchange group 13B and hydroxide ions on a side of anion exchange group 13A.

The hardness component (cations) such as calcium ions and magnesium ions adsorbed by cation exchange group 13B is desorbed by being ion-exchanged with the generated hydrogen ions to thereby reproduce cation exchange group 13B. Moreover, anions such as chloride ions adsorbed by anion exchange group 13A are disassociated by being ion-exchanged with the generated hydroxide ions to thereby reproduce anion exchange group 13A.

At the same time as, or after the control of power source 140 in step S412, controller 150 may control flow regulator 104 such that the flow rate of the soft water flowing into electrochemical cell 101 becomes the predetermined flow rate.

Moreover, a pressure gauge may be provided in first water channel 51 or second water channel 52, and controller 150 may control flow regulator 104 such that the pressure inside first water channel 51 or second water channel 52 becomes the predetermined pressure.

Moreover, a conductivity meter may be provided in first water channel 51 or second water channel 52, and controller 150 may flow regulator 104 or power source 140 such that the conductivity of the water flowing in first water channel 51 or second water channel 52 becomes a second conductivity.
The second conductivity may be the same as, higher than, or lower than the first conductivity.

Next, controller 150 determines whether or not a ninth predetermined time has passed since the application of the voltage in step S412 (step S413). Here, the ninth predetermined time is beforehand set by an experiment or the like in accordance with the number of bipolar membranes 13 arranged inside casing 20, the hardness of the raw water, and the like. The ninth predetermined time may be a time when the conductivity of the water flowing in first water channel 51 or second water channel 52 becomes the second conductivity. The ninth predetermined time may be the same as, longer than, or shorter than the eighth predetermined time.

If controller 150 determines that the ninth predetermined time has passed (Yes in step S413), controller 150 controls power source 140 to stop the supply of the electric power applied to electrode 11 and electrode 12 of electrochemical cell 101 (step S414), and stops the activation of first pump 121 (step S415).

Next, controller 150 opens second valve 132 (step S416). This allows the water inside first connection channel 61, second connection channel 62, first bifurcating channel 63, first confluence channel 65, second tank 108, first water channel 51, electrochemical cell 101, second water channel 52, and the like to be discharged to the outside of water treatment device 100 from the drainage port through drainage channel 54.

Next, controller 150 determines whether or not a tenth predetermined time has passed since the opening of second valve 132 in step S416 (step S417). Here, the tenth predetermined time is a time required for discharging the water inside electrochemical cell 101 and the like to the outside of water treatment device 100 from the drainage port. The eighth predetermined time is appropriately set, based on the volume of electrochemical cell 101, the volume of second tank 108, the volumes of the pipes configuring first water channel 51 and second water channel 52, and the like.

If controller 150 determines that the tenth predetermined time has passed (Yes in step S417), controller 150 closes second valve 132 (step S418) and ends the present program.

A form may be employed in which a float switch is provided inside second tank 108 to open second valve 132 by the float switch. Moreover, a form may be employed in which when the water inside second tank 108 reaches a predetermined water level by the float switch provided inside second tank 108, second valve 132 is closed by the float switch.

In this case, when second valve 132 is opened by the float switch, after executing the processing in step S415, controller 150 ends the program, and when second valve 132 is not opened by the float switch, after executing the processing in step S416, controller 150 ends the program.

Water treatment device 100 configured in this manner according to the present second exemplary embodiment also exerts actions and effects similar to those of water treatment device 100 according to the first exemplary embodiment.

Moreover, in water treatment device 100 according to the second present exemplary embodiment, the reproduction treatment is executed with the soft water inside first tank 107, and the water is discharged to the outside of water treatment device 100, and then, the reproduction treatment is executed with the soft water inside second tank 108.

Here, generally, when conduction starts at the time of reproduction, in an initial stage of the reproduction, an amount of calcium desorbed from bipolar membranes 13 is large. Moreover, as to pH, since adsorbed chlorine ions or sulfate ions are desorbed, a rise of hydroxide ion concentration is small, and a rise of pH is small. In a later stage of the reproduction, since a calcium concentration in reproduced water becomes high, and desorption of the adsorbed chlorine ions and the like has ended, the hydroxide ion concentration rises and pH becomes high, which brings about a condition in which the scale is easily deposited.

Therefore, in water treatment device 100 of the present second exemplary embodiment, in the initial stage of the reproduction when pH is low, calcium having a high concentration is released into the reproduced water in first tank 107 to discharge the reproduced water containing the calcium having the high concentration, and the calcium having the high concentration is discharged to the outside of water treatment device 100. Thereby, in the later state of the reproduction, remaining calcium released into the reproduced water inside second tank 108 comes to have a low concentration, so that the formation of the scale can be suppressed even if pH becomes high.

Moreover, second tank 108 is made larger than first tank 107, and pH rise at the second time of the reproduction when pH becomes high is suppressed more, which can suppress the deposition of the scale more.

Furthermore, reproduction upper limits of the second conductivity on an exit side of electrochemical cell 101 are set individually at the first time when the reproduction treatment is performed, using the water inside first tank 107 and the second time when the reproduction treatment is performed, using the water inside second tank 108, which can suppress the deposition of the scale more. For example, by setting the reproduction upper limit at the first time higher than the reproduction upper limit at the second time, a larger amount of calcium ions can be released at the first time of reproduction when pH is low, so that the deposition of the scale can be more effectively suppressed.

Third Exemplary Embodiment

An electrochemical cell according to the present third exemplary embodiment includes a casing provided with an inflow port of water in a lower portion, and an outflow port of the water in an upper portion, a bipolar membrane laminated body in which two or more bipolar membranes are laminated so as to be opposed, electrodes disposed such that an anode and a cathode are opposed to sandwich the bipolar membrane laminated body, and a first diffusion member disposed between the inflow port and the bipolar membrane laminated body, and provided with through holes communicating between the inflow port and the bipolar membrane laminated body. The first diffusion member is formed such that each of the through holes provided in a peripheral edge portion of the first diffusion member has a larger opening area than each of the through holes provided in a central portion of the first diffusion member.

Moreover, in the electrochemical cell according to the present third exemplary embodiment, a disposition number of the through holes provided in the first diffusion member may be larger in the peripheral edge portion of the first diffusion member than that in the central portion of the first diffusion member.

Moreover, the electrochemical cell according to the present third exemplary embodiment may further include a second diffusion member disposed between the first diffusion member and the bipolar membrane laminated body, and configured such that a pressure loss thereof is smaller than that of each of the bipolar membranes.

In the electrochemical cell according to the present third exemplary embodiment, the second diffusion member may be configured such that a resistance of ionic conduction is larger than that of each of the bipolar membranes.

Moreover, the electrochemical cell according to the present third exemplary embodiment may further include a first rectification member disposed between the second diffusion member and the bipolar membrane laminated body, and configured such that a pressure loss thereof is smaller than that of each of the bipolar membranes.

Moreover, the electrochemical cell according to the present third exemplary embodiment may further include a second rectification member disposed between the bipolar membrane laminated body and the outflow port, and configured such that a pressure loss thereof is smaller than that of each of the bipolar membranes.

Moreover, the electrochemical cell according to the present third exemplary embodiment may further include a third diffusion member disposed between the second rectification member and the inflow port, and configured such that a pressure loss thereof is smaller than that of each of the bipolar membranes.

Moreover, in the electrochemical cell according to the present third exemplary embodiment, the third diffusion member may be configured such that an electric resistance thereof is larger than that of each of the bipolar membranes.

Moreover, the electrochemical cell according to the present third exemplary embodiment may further include a first spacer member disposed between the anode and the bipolar membrane laminated body or between the cathode and the bipolar membrane laminated body, and configured such that a pressure loss thereof is smaller than that of each of the bipolar membranes.

Moreover, the electrochemical cell according to the present third exemplary embodiment, the first spacer member is configured of nonwoven fabric and a mesh member formed in a net shape by weaving a synthetic resin string.

Moreover, in the electrochemical cell according to the present third exemplary embodiment, a diameter of the string of the mesh member may be 50 μm to 200 μm.

Moreover, in the electrochemical cell according to the present third exemplary embodiment, a number of meshes of the mesh member may be 10 to 200.

Hereinafter, one example of the electrochemical cell according to the present third exemplary embodiment will be described with reference to FIGS. 7 to 11.

[Configuration of Electrochemical Cell]

Figure 7:
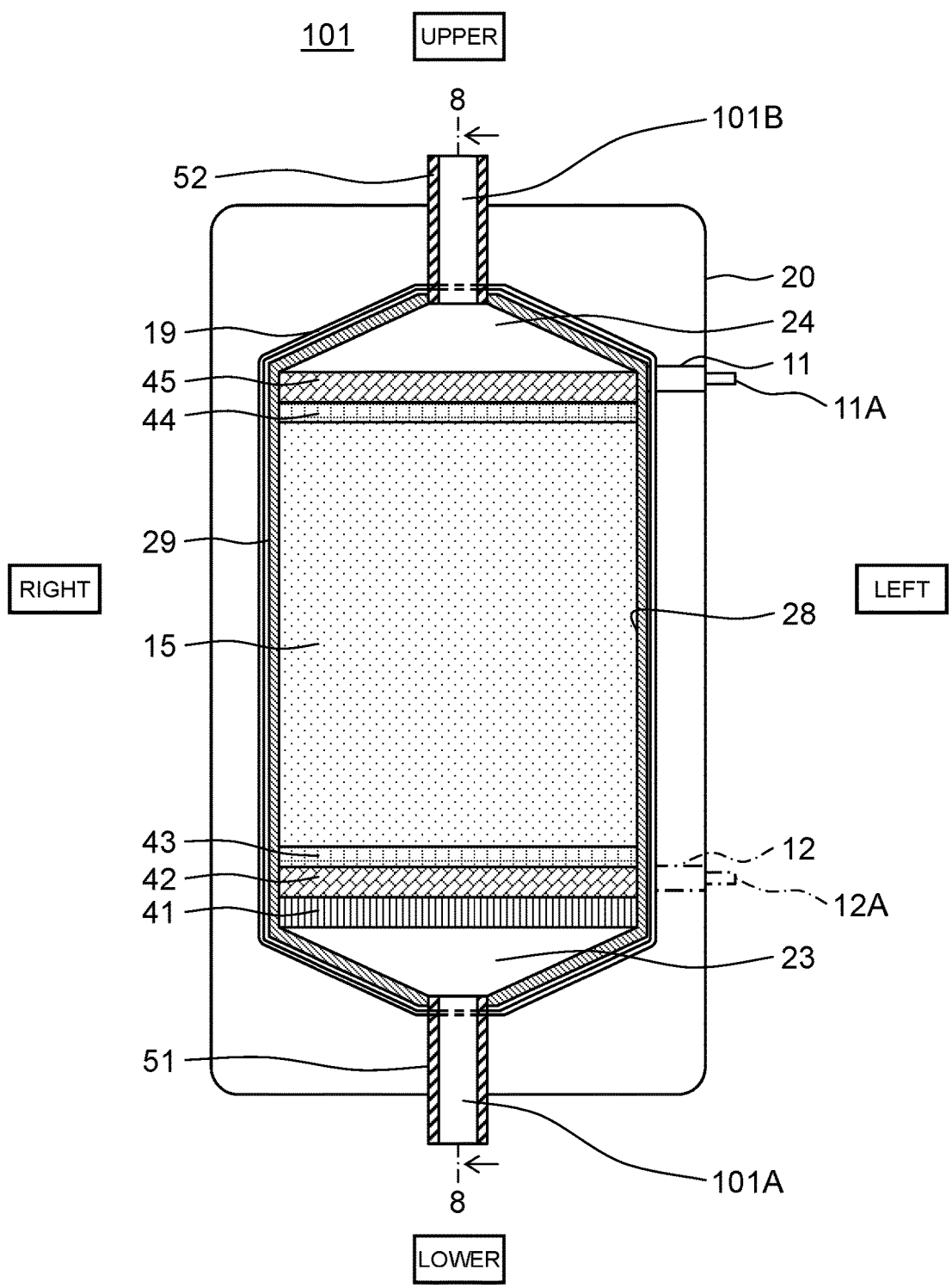
FIG. 7 is a cross-sectional view in a front direction showing a schematic configuration of an electrochemical cell according to the present third exemplary embodiment.
Figure 8:
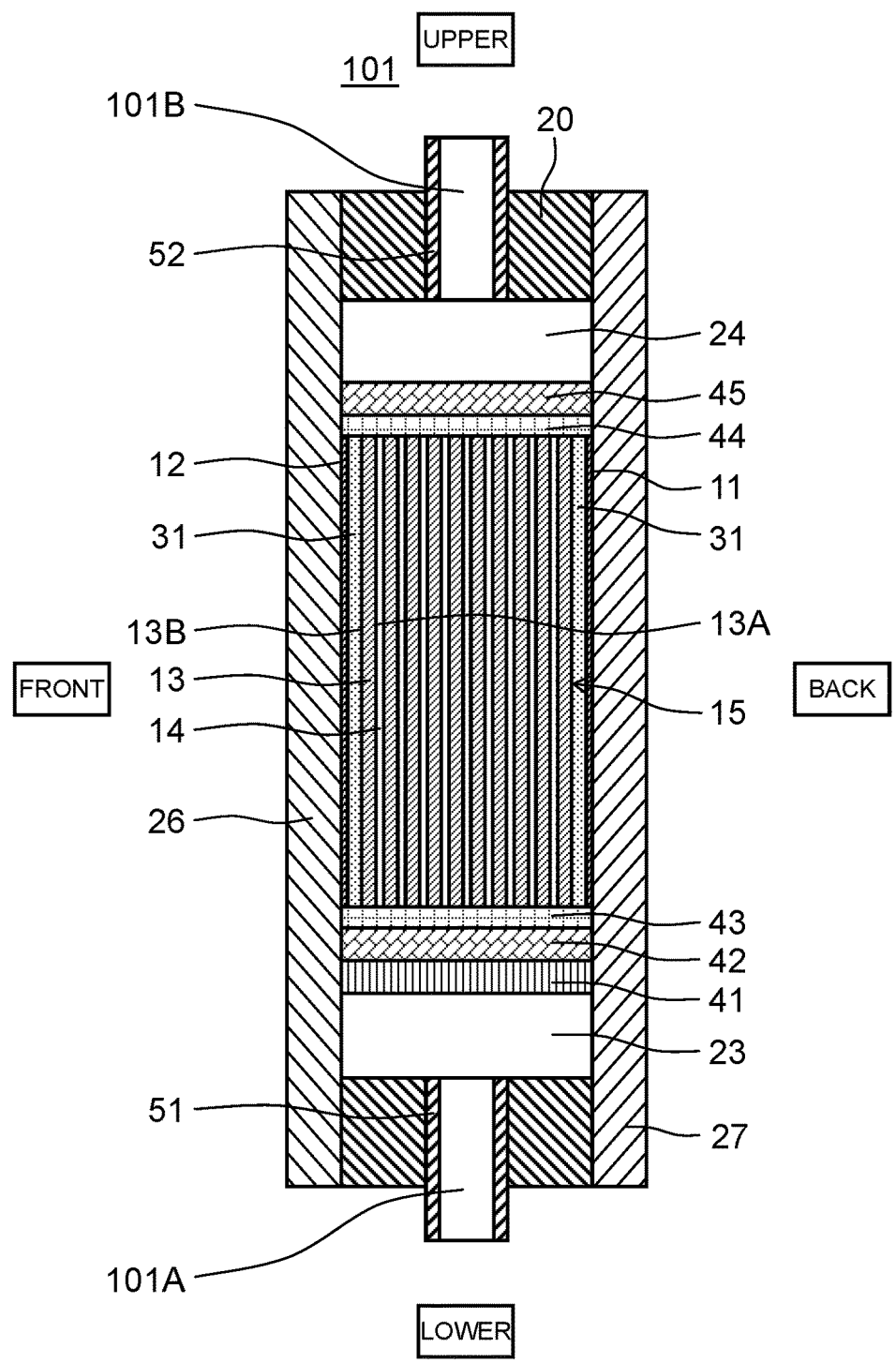
FIG. 8 is a cross-sectional view along 8-8 of the electrochemical cell shown in FIG. 7.

FIG. 7 is a cross-sectional view in a front direction showing a schematic configuration of the electrochemical cell according to the present third exemplary embodiment. FIG. 8 is a cross-sectional view along 8-8 of the electrochemical cell shown in FIG. 7. In FIGS. 7 and 8, an upper-lower direction, a right-left direction, and a front-back direction of the electrochemical cell are indicated as an upper-lower direction, a right-left direction, and a front-back direction in the figures.

As shown in FIGS. 7 and 8, electrochemical cell 101 according to the present third exemplary embodiment includes electrode 11, electrode 12, bipolar membrane laminated body 15, first diffusion member 41, second diffusion member 42, first rectification member 43, second rectification member 44, third diffusion member 45, casing 20, first outer plate 26, and second outer plate 27. Electrode 11 and electrode 12 are disposed so as to sandwich casing 20 from the front-back direction.

Electrode 11 and electrode 12 are made of titanium, and surfaces thereof are coated with platinum and iridium oxide. Electrode 11 and electrode 12 are formed so as to cover through hole 28 of casing 20 described later.

While electrochemical cell 101 according to the present first exemplary embodiment employs a form in which terminal 11A of electrode 11 and terminal 12A of electrode 12 are disposed on the left side, and terminal 11A is disposed in an upper portion, and terminal 12A is disposed in a lower portion, the present disclosure is not limited thereto. For example, terminal 11A and terminal 12A are disposed on the right and left sides, respectively so as to be located in the upper portion.

Moreover, first outer plate 26 and second outer plate 27 are disposed so as to sandwich electrode 11, second seal member 19, casing 20, and electrode 12, and these members are fixed, for example, by screws or the like.

Casing 20 is formed in a plate shape, and is provided with through hole (inner space) 28 in a main surface thereof. An inner peripheral surface (an opening of through hole 28) of casing 20 is formed in an octagonal shape in the present first exemplary embodiment.

Moreover, in the inner peripheral surface of casing 20, first seal member 29 is disposed. First seal member 29 is annularly formed, and for example, made of an olefin-based form material or the like. In FIG. 7, while first seal member 29 is disposed on the upper and lower sides of bipolar membrane laminated body 15, it may be disposed only on lateral sides of bipolar membrane laminated body 15.

Particularly, by disposing first seal member 29 on the lateral sides of bipolar membrane laminated body 15, treatment water can be surely caused to flow inside bipolar membrane laminated body 15.

Furthermore, in a peripheral edge portion of casing 20, second seal member 19 is disposed so as to enclose through hole 28. Second seal member 19 is made of, for example, silicon-based rubber or the like.

Moreover, in a lower end surface of casing 20, a through hole extending in the upper-lower direction and communicating with through hole 28 of the main surface of casing 20 is formed to configure inflow port 101A. In inflow port 101A, an appropriate pipe is connected, and the pipe configures first water channel 51. Similarly, in an upper end surface of casing 20, a through hole extending in the upper-lower direction and communicating with through hole 28 of the main surface of casing 20 is formed to configure outflow port 101B. In outflow port 101B, an appropriate pipe is connected, and the pipe configures second water channel 52.

In through hole 28 of casing 20, inlet chamber 23, first diffusion member 41, second diffusion member 42, first rectification member 43, bipolar membrane laminated body 15, second rectification member 44, third diffusion member 45, and outlet chamber 24 are disposed in order from bottom, and these members are formed so as to be fitted in through hole 28 by first seal member 29.

Inlet chamber 23 is formed in a tapered shape (i.e., a trapezoidal shape) expanding from the lower side to the upper side when viewed from a normal direction of the main surface of casing 20 (a lamination direction of bipolar membranes 13).

This allows the water supplied from first water channel 51 through the one inflow port to uniformly flow inside electrochemical cell 101. Moreover, the water flowing into electrochemical cell 101 through inflow port 101A from first water channel 51 flows while expanding in a horizontal direction (particularly, in the right-left direction) due to inlet chamber 23.

First diffusion member 41 is formed in a plate shape, and is configured such that the water supplied from first water channel 51 is caused to uniformly flow inside electrochemical cell 101. Here, with reference to FIG. 9, a configuration of first diffusion member 41 will be described in detail.

Figure 9:
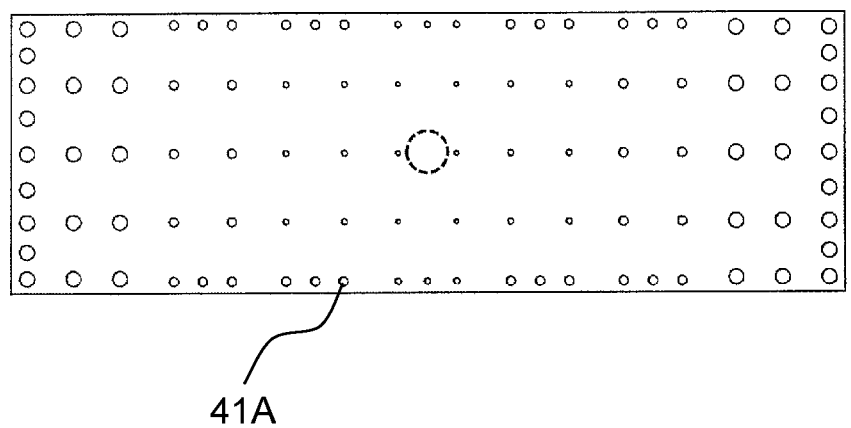
FIG. 9 is a schematic view showing a schematic configuration of a first diffusion member of the electrochemical cell shown in FIG. 7.

FIG. 9 is a schematic view showing a schematic configuration of the first diffusion member of the electrochemical cell shown in FIG. 7. A broken line shown in FIG. 9 indicates a portion opposed to inflow port 101A.

As shown in FIG. 9, in a main surface of first diffusion member 41, a plurality of through holes 41A are provided. Each of through holes 41A provided in a peripheral edge portion of first diffusion member 41 is formed so as to have a larger opening area than each of the through holes provided in a central portion (a portion opposed to inflow port 101A) of first diffusion member 41. In the present first exemplary embodiment, through holes 41A are formed so as to each have the larger opening area as they become farther from the central portion of first diffusion member 41 (as a distance from the central portion becomes larger). Moreover, first diffusion member 41 is formed such that a disposition number of through holes 41A in the peripheral edge portion is larger than that in the central portion.

This hinders upward movement of the water flowing into inlet chamber 23 due to the main surface of first diffusion member 41, and promotes movement thereof in the horizontal direction. The water moves from through holes 41A provided in first diffusion member 41 into second diffusion member 42.

Second diffusion member 42 is configured so that a pressure loss thereof is smaller than that of each of bipolar membranes 13. Specifically, second diffusion member 42 is configured of a fiber structure of a polyolefin-based material. Moreover, second diffusion member 42 may be configured such that a resistance of ionic conduction is larger than that of bipolar membrane 13.

First rectification member 43 is configured such that a pressure loss thereof is larger than that of second diffusion member 42, and smaller than that of bipolar membrane 13. First rectification member 43 may be a porous structure having a number of holes finer than that of each of through holes 41A of first diffusion member 41. Furthermore, first rectification member 43 may be configured such that the resistance of ionic conduction thereof is larger than that of bipolar membrane 13.

Specifically, first rectification member 43 is configured of a polyethylene sintered porous body. First rectification member 43 may have any aspect, as long as it is configured to have a pressure loss smaller than that of bipolar membrane 13, and for example, may be a polyethylene or polypropylene sintered porous body, a polymethyl methacrylate sintered porous body, or the like.

Bipolar membrane laminated body 15 includes two or more bipolar membranes 13 and net-shaped second spacer members 14, and second spacer members 14 are disposed between bipolar membranes 13. As bipolar membranes 13, publicly known, various types of bipolar membranes can be used, and as a method for manufacturing the same as well, a publicly known method can be used. For example, a bipolar membrane (a porous ion exchanger) disclosed in WO 2012/039127 may be used.

Here, with reference to FIG. 10, a configuration of each of second spacer members 14 will be described in detail.

Figure 10:
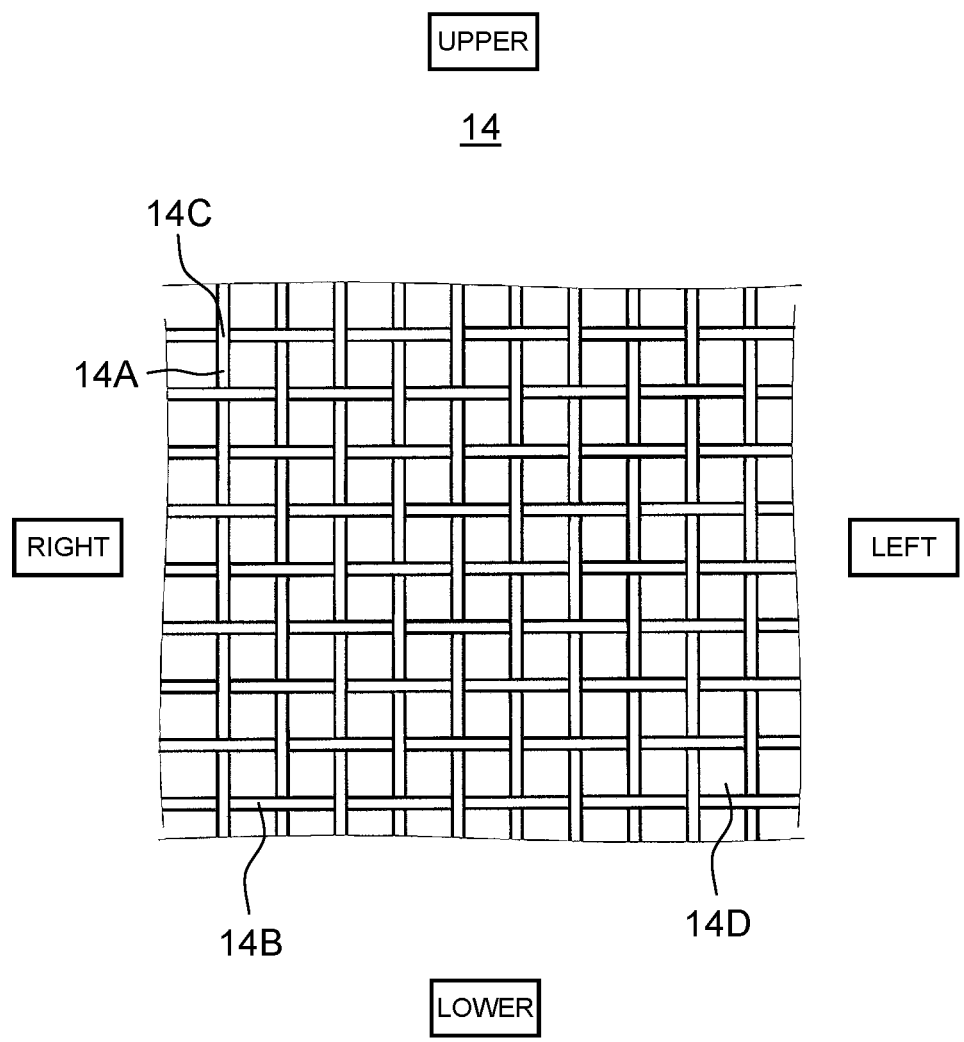
FIG. 10 is a schematic view showing one example of a second spacer member of the electrochemical cell according to the present third exemplary embodiment.

FIG. 10 is a schematic view showing one example of the second spacer member of the electrochemical cell according to the present third exemplary embodiment. In FIG. 10, an upper-lower direction and a right-left direction of the second spacer member are indicated as an upper-lower direction and a right-left direction in the figure.

As shown in FIG. 10, second spacer member 14 has first members 14A (warp) extending in the upper-lower direction and second members 14B (woof) extending in the right-left direction, and is formed in a net shape resulting from weaving first members 14A and second members 14B to have a structure communicating between front and back surfaces. More particularly, first members 14A are each provided with a number of communication holes in a main surface thereof such that the water flows inside second spacer member 14.

Moreover, second spacer member 14 has portions 14C where first members 14A and second members 14B cross (overlap), and spaces 14D surrounded by first members 14A and second members 14B.

A number of meshes (a number of spaces 14D) of second spacer member 14 can be arbitrarily set, and for example, in order to assure electric field intensity to bipolar membrane 13, the number of meshes may be 10 to 200. Moreover, first members 14A and second members 14B each have a diameter of 50 μm to 200 μm, which makes a step at each crossing point small, and makes it easy for the water to flow inside bipolar membrane 13, so that removal performance of the hardness component increases.

Moreover, second spacer member 14 may have insulating properties in view of preventing an electric current from flowing between adjacent bipolar membranes 13. Moreover, for second spacer member 14, a material such as polypropylene (PP), polyethylene (PE), and polyester may be used.

Moreover, even when for second spacer member 14, nonwoven fabric is used, which is not shown, there are effects similar to those when the net-shaped configuration is employed.

As shown in FIG. 8, bipolar membrane laminated body 15 is disposed such that cation exchange group 13B of each of bipolar membranes 13 is opposed to electrode 12, and anion exchange group 13A is opposed to electrode 11, and the plurality of bipolar membranes 13 are laminated in a direction perpendicular to a vertical direction. Second spacer members 14 are disposed between layers of adjacent bipolar membranes 13.

Moreover, first spacer members 31 are disposed between electrode 11 and bipolar membrane laminated body 15 and between electrode 12 and bipolar membrane laminated body 15.

First spacer members 31 are each configured such that a pressure loss thereof is smaller than that of each of bipolar membranes 13.

Specifically, each of first spacer members 31 is configured of nonwoven fabric and a mesh member formed in a net shape by weaving a synthetic resin string, and at least two or more layers of a layer configured of the nonwoven fabric and a layer configured of the mesh member are laminated.

As the nonwoven fabric and the mesh member configuring first spacer member 31, for example, a material such as polypropylene (PP), polyethylene (PE), and polyester may be used, or a material having insulating properties, and having a low resistance of ionic conduction may be used. Therefore, hydrophilic treatment may be performed.

Moreover, the mesh member may have a shape similar to that of second spacer member 14 shown in FIG. 10. Furthermore, first spacer member 31 may be configured such that a pressure loss thereof is smaller than that of second spacer member 14, or may be configured such that the pressure loss thereof is the same as, or larger than that of second spacer member 14.

Second rectification member 44 is configured such that a pressure loss thereof is larger than that of third diffusion member 45, and smaller than that of bipolar membrane 13. Moreover, second rectification member 44 may be a porous structure having a number of holes finer than each of through holes 41A of first diffusion member 41.

Specifically, second rectification member 44 is configured of a polyethylene sintered porous body. Second rectification member 44 may have any aspect, as long as it is configured to have a pressure loss smaller than that of bipolar membrane 13, and for example, may be a polypropylene sintered porous body, a polymethyl methacrylate sintered porous body, or the like.

Third diffusion member 45 is configured such that a pressure loss thereof is smaller than that of bipolar membrane 13. Specifically, third diffusion member 45 is configured of a fiber structure of a polyolefin-based material. Moreover, third diffusion member 45 may be configured such that an electric resistance thereof is larger than that of bipolar membrane 13.

Outlet chamber 24 is formed in a tapered shape (i.e., a trapezoidal shape) expanding from the upper side to the lower side when viewed from the normal direction of the main surface of casing 20. In other words, outlet chamber 24 is formed so as to converge on outflow port 101B when viewed from a flow direction of the water. This allows the water supplied from first water channel 51 to uniformly flow inside electrochemical cell 101 without stagnating.

Electrochemical cell 101 according to the present third exemplary embodiment may be used as electrochemical cell 101 of above-described water treatment device 100 according to the first exemplary embodiment, or as electrochemical cell 101 of water treatment device 100 according to the second exemplary embodiment.

[Operation, and Actions and Effects of Electrochemical Cell]

Next, operation, and actions and effects of electrochemical cell 101 according to the present third exemplary embodiment will be described with reference to FIGS. 7 to 10.

During the water softening treatment, the raw water flows from inflow port 101A to outflow port 101B. Normally, a voltage is applied with electrode 11 opposed to cation exchange group 13B as an anode and with electrode 12 opposed to anion exchange group 13A as a cathode. When electrochemical cell 101 is used in a region where the hardness of the raw water is relatively low, even if the raw water flows without supplying electric power to electrodes 11, 12, the hardness component can be considerably removed.

On the other hand, during the reproduction of the ion exchange resin (during the reproduction treatment), the water for reproduction is caused to flow from inflow port 101A to outflow port 101B, and a voltage having opposite polarities to those during the water softening treatment is applied. That is, the voltage is applied with electrode 11 as an cathode and with electrode 12 as an anode.

The water supplied from inflow port 101A to inlet chamber 23 flows toward first diffusion member 41 while expanding in the right-left direction during flowing inside inlet chamber 23.

The main surface of first diffusion member 41 hinders upward movement of the water flowing into inlet chamber 23, and promotes movement in the horizontal direction.

In first diffusion member 41, the number of through holes 41A is smaller and the opening area of each of through holes 41A is smaller in the central portion than those in the peripheral edge portion. Therefore, the water flowing inside inlet chamber 23 flows in through holes 41A provided in the peripheral edge portion of first diffusion member 41 more easily than in through holes 41A provided in the central portion of first diffusion member 41. Accordingly, the water flowing into electrochemical cell 101 from inflow port 101A easily flows in the horizontal direction more uniformly due to first diffusion member 41.

The water flowing into second diffusion member 42 from through holes 41A of first diffusion member 41 flows inside second diffusion member 42 uniformly, because second diffusion member 42 has the pressure loss smaller than that of bipolar membrane 13, and then the water flows into first rectification member 43.

First rectification member 43 is configured such that the pressure loss thereof is larger than that of second diffusion member 42, and smaller than that of bipolar membrane 13. This generates turbulence inside second diffusion member 42, such that a flow rate (a flow velocity) in the horizontal direction of the water flowing into first rectification member 43 is more uniformized. Moreover, since first rectification member 43 has the pressure loss larger than second diffusion member 42, a channel length from inlet chamber 23 to first rectification member 43 (a length in the upper-lower direction from inlet chamber 23 to first rectification member 43) can be shortened, so that downsizing of electrochemical cell 101 can be achieved.

The water flowing inside first rectification member 43 is supplied to bipolar membrane laminated body 15. As to the water supplied to bipolar membrane laminated body 15, during the water softening treatment, the hardness component (cations) such as a magnesium component in the raw water supplied to electrochemical cell 101 is adsorbed and removed by cation exchange groups 13B existing inside bipolar membranes 13. Moreover, the anions such as chloride ions in the raw water are adsorbed and removed by anion exchange groups 13A.

Here, since for second diffusion member 42 and first rectification member 43, the materials having higher resistances of ionic conduction than that of bipolar membrane 13 are used, ions such as calcium ions and chloride ions moving between the electrodes move inside bipolar membranes 13 without moving inside second diffusion member 42 and first rectification member 43. Therefore, adsorption and removal can be performed with high current efficiency.

On the other hand, during the reproduction treatment, the potential difference is generated in each of bipolar membranes 13, and at the interface formed by cation exchange group 13B and anion exchange group 13A of bipolar membrane 13, the water is disassociated to generate hydrogen ions on a side of cation exchange group 13B and hydroxide ions on a side of anion exchange group 13A.

The hardness component (cations) such as calcium ions and magnesium ions adsorbed by cation exchange group 13B is desorbed by being ion-exchanged with the generated hydrogen ions to thereby reproduce cation exchange group 13B. Moreover, anions such as chloride ions adsorbed by anion exchange group 13A are disassociated by being ion-exchanged with the generated hydroxide ions to thereby reproduce anion exchange group 13A.

Near electrode 11 or electrode 12, a hydroxide ion concentration easily becomes high when electrode 11 or electrode 12 becomes a cathode, so that when the hydroxide ion concentration rapidly rises and pH rises, a concentration of carbonate ions and the like rapidly rises, and scale of calcium carbonate becomes easy to generate.

However, in electrochemical cell 101 according to the present third exemplary embodiment, first spacer members 31 are disposed between electrode 11 and bipolar membrane laminated body 15 and between electrode 12 and bipolar membrane laminated body 15. Since each of first spacer members 31 has the pressure loss smaller than that of bipolar membrane 13, a flow velocity of the water flowing inside first spacer member 31 becomes higher than the flow velocity of the water flowing in bipolar membrane 13.

Thus, at end portions in the front-back direction (in the lamination direction) of bipolar membrane laminated body 15, the hydroxide ions flow out to second rectification member 44, so that a rapid rise of hydroxide ion concentration can be suppressed. This can suppress the rapid rise of the concentration of carbonate ions or the like at the end portions, and can suppress the formation of scale more.

The water flowing in bipolar membrane laminated body 15 flows into second rectification member 44. Second rectification member 44 is configured such that the pressure loss thereof is larger than that of third diffusion member 45, and smaller than that of bipolar membrane 13. Therefore, the water flowing into second rectification member 44 from bipolar membrane laminated body 15 is supplied to third diffusion member 45 in a state where a uniform flow is kept.

Moreover, since second rectification member 44 has the pressure loss larger than third diffusion member 45, a channel length from second rectification member 44 to outlet chamber 24 (a length in the upper-lower direction from second rectification member 44 to outlet chamber 24) can be shortened, so that downsizing of electrochemical cell 101 can be achieved.

The water supplied to third diffusion member 45 is supplied to outlet chamber 24 while keeping a flow rate (a flow velocity) in the horizontal direction uniform, because third diffusion member 45 has the pressure loss smaller than that of bipolar membrane 13. The water supplied to outlet chamber 24 converges toward outflow port 101B while flowing inside outlet chamber 24, and is discharged from outflow port 101B to the outside of electrochemical cell 101.

In electrochemical cell 101 configured in this manner according to the present third exemplary embodiment, each of inlet chamber 23, first diffusion member 41, second diffusion member 42, first rectification member 43, second rectification member 44, third diffusion member 45, and outlet chamber 24 can make uniform the flow rate (flow velocity) in the horizontal direction of the water flowing inside electrochemical cell 101. This allows the water treatment in electrochemical cell 101 to be efficiently executed.

Moreover, in electrochemical cell 101 according to the present third exemplary embodiment, first spacer members 31 are disposed at both the end portions of bipolar membrane laminated body 15, which can suppress the rapid rise of the hydroxide ion concentration. This can suppress the rapid rise of the concentration of carbonate ions at the end portions, and can suppress the formation of scale more.

Furthermore, in electrochemical cell 101 according to the present third exemplary embodiment, net-shaped second spacer members 14 between the layers of adjacent bipolar membranes 13 are disposed, which brings the water located in spaces 14D of second spacer members 14 into contact with second members 14B when moving upward. Since second members 14B do not transmit the water, the water brought into contact with second members 14B becomes easy to move in the front-back direction.

This makes it easy for the water inside spaces 14D to permeate an inside of bipolar membrane 13, and can efficiently bring the water into contact with the ion exchange resin inside bipolar membrane 13. Accordingly, in electrochemical cell 101 according to the present third exemplary embodiment, the water treatment can be efficiently executed.

Fourth Exemplary Embodiment

An electrochemical cell according to the present fourth exemplary embodiment further includes, between two bipolar membranes, a second spacer member having a communication structure between front and back surfaces, and the second spacer member is formed such that a distance between the two bipolar membranes is larger on an end portion side of a bipolar membrane laminated body than that in a central portion.

Hereinafter, one example of the electrochemical cell according to the present fourth exemplary embodiment will be described with reference to FIG. 11.

[Configuration of Electrochemical Cell]

Figure 11:
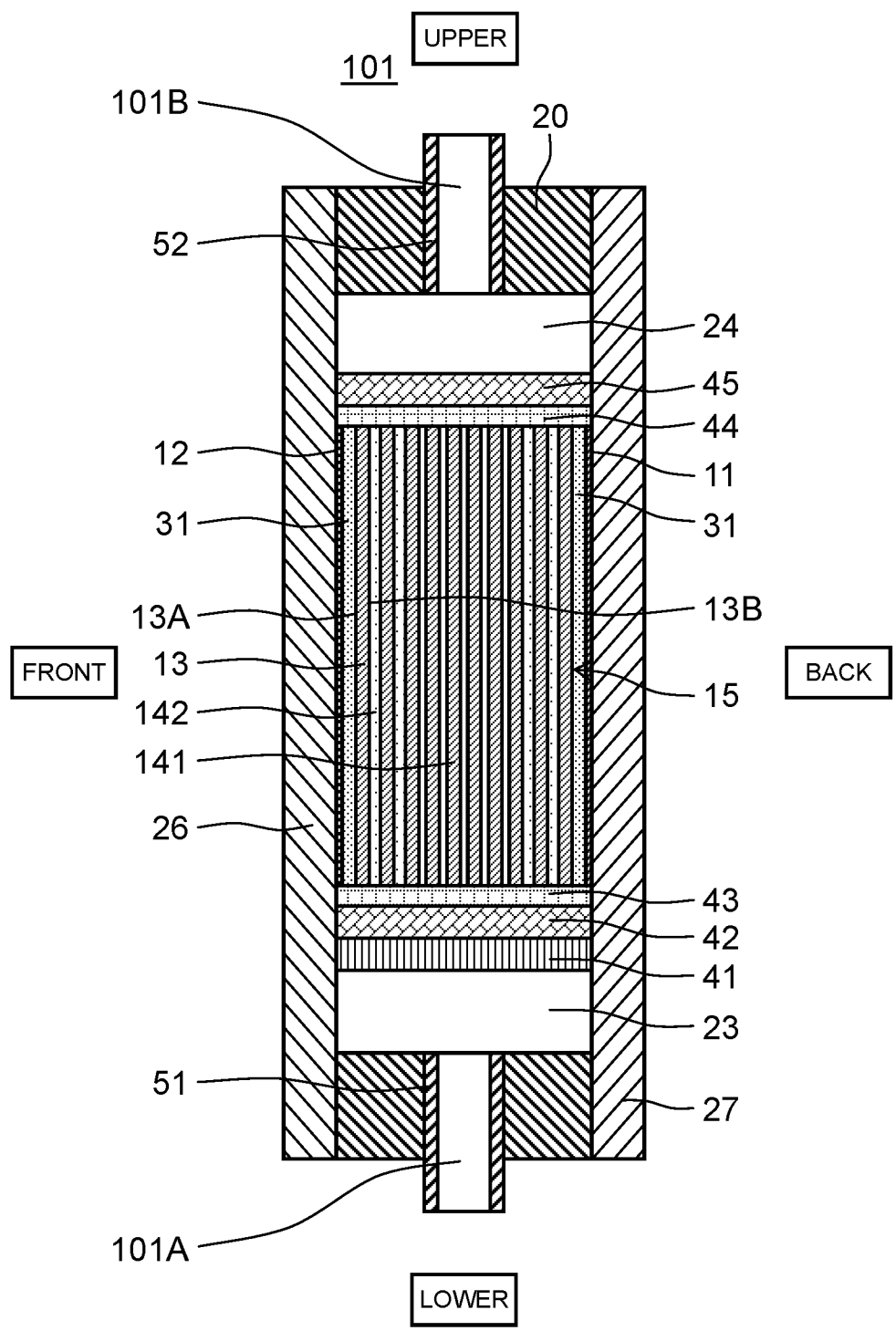
FIG. 11 is a cross-sectional view showing a schematic configuration of an electrochemical cell according to the present fourth exemplary embodiment.

FIG. 11 is a cross-sectional view showing a schematic configuration of the electrochemical cell according to the present fourth exemplary embodiment.

As shown in FIG. 11, although having the same basic configuration as that of electrochemical cell 101 according to the third exemplary embodiment, electrochemical cell 101 according to the present fourth exemplary embodiment is different in that second spacer members 142 on an end portion side of bipolar membrane laminated body 15 each have a larger thickness than those in second spacer members 141 disposed in a central portion of bipolar membrane laminated body 15 (in a central portion in a lamination direction of bipolar membranes 13).

This can make a distance between the two bipolar membranes 13 on the end portion side of bipolar membrane laminated body 15 larger than that in the central portion. While in the present fourth exemplary embodiment, the aspect is employed in which by making a thickness of each of second spacer members 142 larger than a thickness of each of second spacer members 141, the distance between two bipolar membranes 13 is made larger on the end portion side of bipolar membrane laminated body 15 than that in the central portion, the present disclosure is not limited thereto. For example, an aspect may be employed, in which by making a number of second spacer members 14 disposed between two bipolar membranes 13 on the end portion side of bipolar membrane laminated body 15 larger than that in the central portion, the distance between two bipolar membranes 13 is made larger on the end portion side of bipolar membrane laminated body 15 than that in the central portion.

Electrochemical cell 101 configured in this manner according to the present fourth exemplary embodiment also exerts actions and effects similar to those of electrochemical cell 101 according to the third exemplary embodiment.

In electrochemical cell 101 according to the present fourth exemplary embodiment, since the distance between two bipolar membranes 13 on the end portion side of bipolar membrane laminated body 15 is larger than that in the central portion, the water flowing in second spacer members 142 has a flow velocity higher than the water flowing in second spacer members 141.

Therefore, in electrochemical cell 101 according to the present fourth exemplary embodiment, hydroxide ions generated near electrode 11 or electrode 12 can flow out to a side of second rectification member 44 more easily than those in electrochemical cell 101 according to the third exemplary embodiment. This can suppress a rapid rise of a hydroxide ion concentration up to a range of the inside of bipolar membrane laminated body 15, and can suppress the formation of scale more.

Fifth Exemplary Embodiment

An electrochemical cell according to the present fifth exemplary embodiment further includes a cation exchange membrane between an anode and a bipolar membrane laminated body, or between a cathode and the bipolar membrane laminated body.

Figure 12:
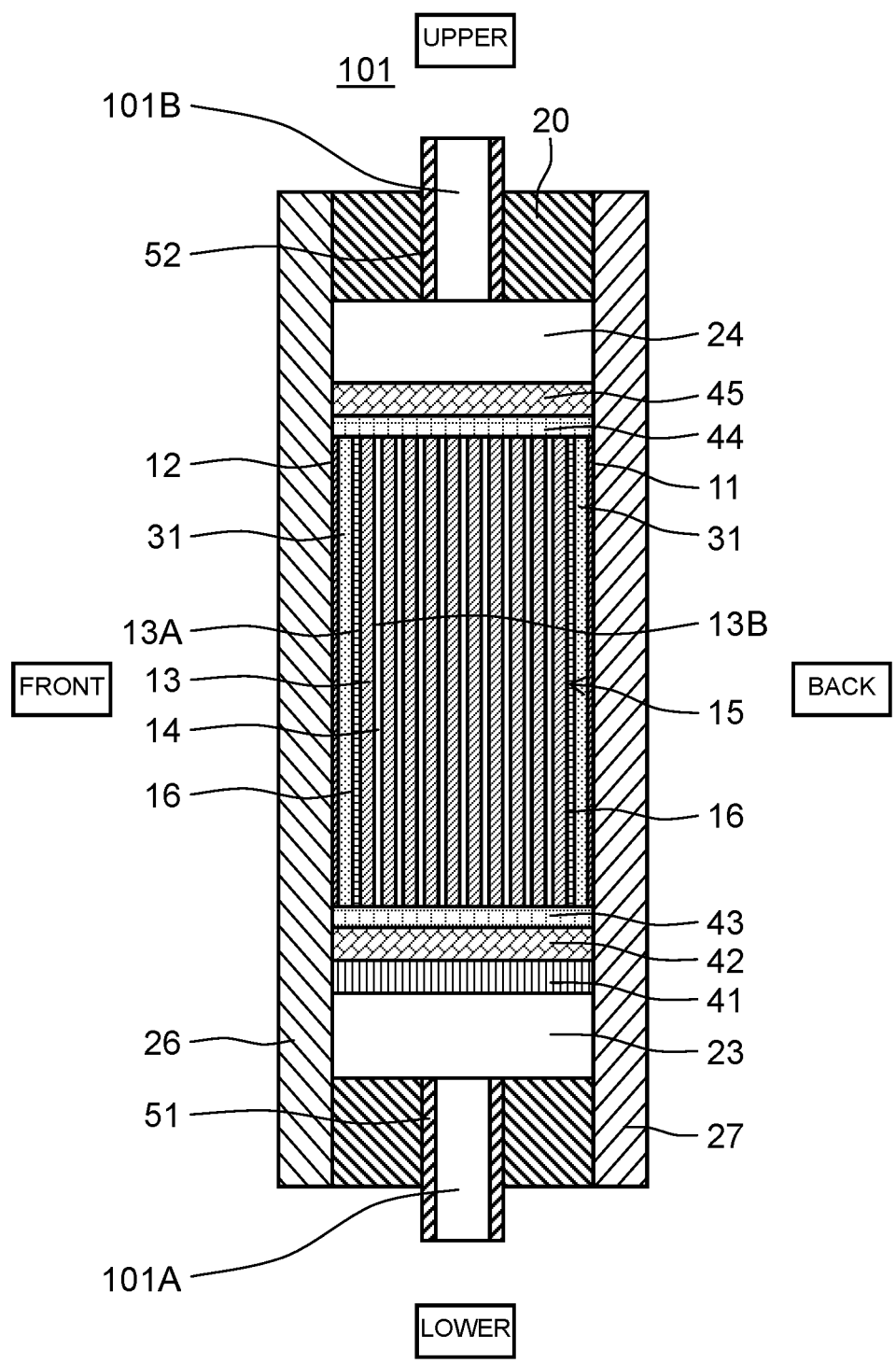
FIG. 12 is a cross-sectional view showing a schematic configuration of an electrochemical cell according to the present fifth exemplary embodiment.
Figure 13:
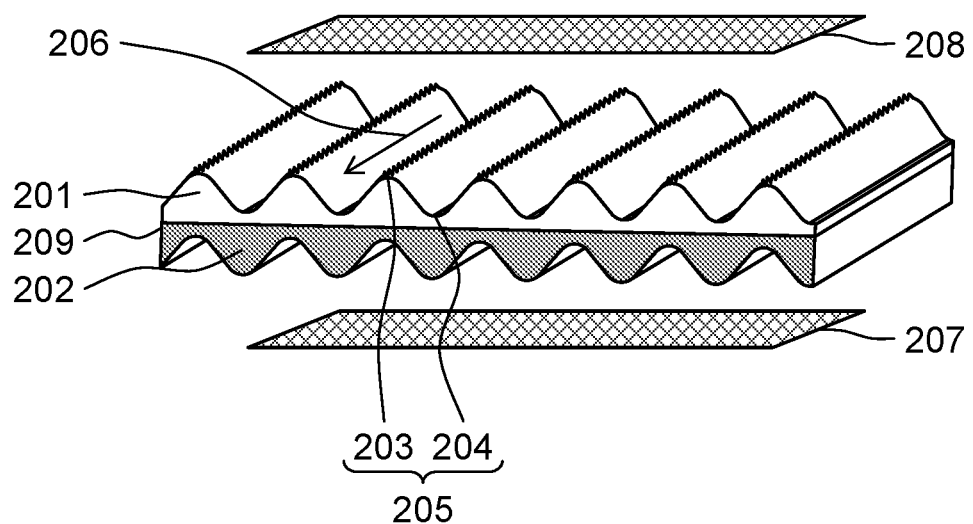
FIG. 13 is a schematic view showing a schematic configuration of a textured membrane disclosed in PTL 1.

Hereinafter, one example of the electrochemical cell according to the present fifth exemplary embodiment will be described with reference to FIG. 12.
[Configuration of Electrochemical Cell]
FIG. 12 is a cross-sectional view showing a schematic configuration of the electrochemical cell according to the present fifth exemplary embodiment.

As shown in FIG. 12, although having the same basic configuration as that of electrochemical cell 101 according to the third exemplary embodiment, electrochemical cell 101 according to the present fifth exemplary embodiment is different in that it further includes cation exchange membranes 16 between electrode 11 and bipolar membrane laminated body 15, and between electrode 12 and bipolar membrane laminated body 15.

Cation exchange membranes 16 are each configured of a homogeneous membrane. As cation exchange membranes 16, for example, Nafion (registered trademark), SELEMION (registered trademark), NEOSEPTA (registered trademark) or the like may be used.

Electrochemical cell 101 configured in this manner according to the present fifth exemplary embodiment also exerts actions and effects similar to those of electrochemical cell 101 according to the third exemplary embodiment.

Moreover, since in electrochemical cell 101 according to the present fifth exemplary embodiment, cation exchange membranes 16 are disposed between electrode 11 and bipolar membrane laminated body 15, and between electrode 12 and bipolar membrane laminated body 15, hydroxide ions generated near electrode 11 or electrode 12 can be prevented from moving to bipolar membrane laminated body 15. This can suppress a rapid rise of a hydroxide ion concentration, and can suppress the formation of scale more.

In electrochemical cell 101 according to the present fifth exemplary embodiment, the aspect may be employed in which a distance between two bipolar membranes 13 is larger on the end portion side of bipolar membrane laminated body 15 than that in the central portion as in electrochemical cell 101 according to the fourth exemplary embodiment.

From the foregoing description, many improvements or other exemplary embodiments of the present disclosure will be evident to those skilled in the art. Accordingly, the foregoing description should be construed only as illustration, and is provided for the purpose of teaching best modes in which the present disclosure is implemented to those skilled in the art. Details of at least one of the structures and the functions can be substantially modified without departing from the gist of the present disclosure. Moreover, an appropriate combination of the plurality of components disclosed in the above-described exemplary embodiments enables various inventions to be formed.

INDUSTRIAL APPLICABILITY

According to an electrochemical cell, a water treatment device provided with the same, and an operating method for water treatment device according to the present disclosure, uniformization of a flow of water inside the electrochemical cell can be achieved, or during reproduction of bipolar membranes, a hardness of water supplied to an inside of the electrochemical cell can be decreased, and formation of scale can be suppressed, so that the present disclosure is useful in a field of water treatment.

REFERENCE MARKS IN THE DRAWINGS 11 electrode
11A terminal
12 electrode
12A terminal
13 bipolar membrane
13A anion exchange group
13B cation exchange group
14 second spacer member
14A first member
14B second member
14C portion
14D space
15 bipolar membrane laminated body
16 cation exchange membrane
19 second seal member
20 casing
23 inlet chamber
24 outlet chamber
26 first outer plate
27 second outer plate
28 through hole
29 first seal member
31 first spacer member
41 first diffusion member 41A through hole
42 second diffusion member
43 first rectification member
44 second rectification member
45 third diffusion member
51 first water channel
52 second water channel
52A supply port
53 third water channel
54 drainage channel
60 connection channel
61 first connection channel
62 second connection channel
63 first bifurcating channel
64 second bifurcating channel
65 first confluence channel
66 second confluence channel
100 water treatment device
101 electrochemical cell
101A inflow port
101B outflow port
102 water storage tank
103 tank
104 flow regulator
105 check valve
106 scale suppressant storage tank
107 first tank
108 second tank
111 first channel switch
112 second channel switch
113 first switch
114 second switch
121 first pump
122 second pump
131 first valve
132 second valve
140 power source
141 second spacer member
142 second spacer member
150 controller

The invention claimed is:

1. An electrochemical cell comprising:
a casing provided with an inflow port of water in a lower portion and an outflow port of the water in an upper portion;
a bipolar membrane laminated body in which two or more bipolar membranes are laminated so as to be opposed;
electrodes disposed such that an anode and a cathode are opposed to sandwich the bipolar membrane laminated body; and
a first diffusion member disposed between the inflow port and the bipolar membrane laminated body, and provided with through holes communicating between the inflow port and the bipolar membrane laminated body,
wherein the first diffusion member is formed such that each of the through holes provided in a peripheral edge portion of the first diffusion member has a larger opening area than each of the through holes provided in a central portion of the first diffusion member.

2. The electrochemical cell according to claim 1, wherein a disposition number of the through holes provided in the first diffusion member is larger in the peripheral edge portion of the first diffusion member than that in the central portion of the first diffusion member.

3. The electrochemical cell according to claim 1, further comprising a second diffusion member disposed between the first diffusion member and the bipolar membrane laminated body, and configured such that a pressure loss of the second diffusion member is smaller than that of each of the bipolar membranes.

4. The electrochemical cell according to claim 3, wherein the second diffusion member is configured such that a resistance of ionic conduction is larger than that of each of the bipolar membranes.

5. The electrochemical cell according to claim 1, further comprising a first rectification member disposed between the second diffusion member and the bipolar membrane laminated body, and configured such that a pressure loss of the first rectification member is smaller than that of each of the bipolar membranes.

6. The electrochemical cell according to claim 1, further comprising a second rectification member disposed between the bipolar membrane laminated body and the outflow port, and configured such that a pressure loss of the second rectification member is smaller than that of each of the bipolar membranes.

7. The electrochemical cell according to claim 6, wherein at least one of the first rectification member and the second diffusion member is configured such that a resistance of ionic conduction of the at least one of the first rectification member and the second diffusion member is larger than that of each of the bipolar membranes.

8. The electrochemical cell according to claim 6, further comprising a third diffusion member disposed between the second rectification member and the outflow port, and configured such that a pressure loss of the third diffusion member is smaller than that of each of the bipolar membranes.

9. The electrochemical cell according to claim 8, wherein the third diffusion member is configured such that a resistance of ionic conduction is larger than that of each of the bipolar membranes.

10. The electrochemical cell according to claim 1, further comprising a first spacer member disposed between the anode and the bipolar membrane laminated body or between the cathode and the bipolar membrane laminated body, and configured such that a pressure loss of the first spacer member is smaller than that of each of the bipolar membranes.

11. The electrochemical cell according to claim 10, wherein the first spacer member is configured of nonwoven fabric and a mesh member formed in a net shape by weaving a synthetic resin string.

12. The electrochemical cell according to claim 10, wherein a diameter of the string of the mesh member is 50 μm to 200 μm.

13. The electrochemical cell according to claim 11, wherein a number of meshes of the mesh member is 10 to 200.

14. The electrochemical cell according to claim 1, further comprising a second spacer member between the two bipolar membranes, the second spacer member having a communication structure between front and back surfaces,
wherein the second spacer member is formed such that a distance between the two bipolar membranes is larger on an end portion side of the bipolar membrane laminated body than that in a central portion.

15. The electrochemical cell according to claim 1, further comprising a cation exchange membrane disposed between the anode and the bipolar membrane laminated body or between the cathode and the bipolar membrane laminated body.

16. A water treatment device comprising:
    the electrochemical cell according to claim 1;
    a first water channel connected to the inflow port;
    a second water channel that connects the outflow port and a supply port to which water subjected to water softening treatment by the electrochemical cell is supplied;
    a connection channel that connects the second water channel and the first water channel;
    a channel switch that switches a flow destination of water flowing in the second water channel to the supply port or the connection channel; and
    a pump provided in the connection channel.

17. The water treatment device according to claim 16, further comprising a controller that controls the channel switch such that the flow destination of the water flowing in the second water channel becomes the connection channel, and activates the pump, when the bipolar membranes are reproduced.

18. The water treatment device according to claim 17, further comprising:
    a first tank;
    a second tank;
    a first switch; and
    a second switch, the first tank, the second tank, the first switch, and the second switch being provided in the connection channel,
    wherein
    the connection channel has a first connection channel one end of which is connected to the second water channel, a second connection channel one end of which is connected to the first water channel, a first bifurcating channel that connects another end of the first connection channel and the first tank, a second bifurcating channel that connects the other end of the first connection channel and the second tank, a first confluence channel that connects the first tank and another end of the second connection channel, and a second confluence channel that connects the second tank and the other end of the second connection channel,
    the first switch is configured to switch a flow destination of water flowing in the first connection channel to the first tank or the second tank, and
    the second switch is configured to switch, to the first tank or the second tank, a supply source of water to be supplied to the second connection channel.

19. The water treatment device according to claim 18, wherein
    when the bipolar membranes are reproduced,
    the controller controls the channel switch such that the flow destination of the water flowing in the second water channel becomes the connection channel,
    the controller controls the first switch such that the flow destination of the water flowing in the first connection channel becomes the first tank, controls the second switch such that the supply source of the water to be supplied to the second connection channel becomes the first tank, and activates the pump, and
    the controller controls the first switch such that the flow destination of the water flowing in the first connection channel becomes the second tank, controls the second switch such that the supply source of the water to be supplied to the second connection channel becomes the second tank, and activates the pump.

20. The water treatment device according to claim 18, wherein a volume of the second tank is larger than a volume of the first tank.

21. The water treatment device according to claim 16, further comprising a scale suppressant feeder that supplies a scale suppressant to the connection channel.

22. A water treatment device comprising:
    an electrochemical cell having a casing provided with an inflow port of water in a lower portion, and an outflow port of the water in an upper portion, a bipolar membrane laminated body in which two or more bipolar membranes are laminated so as to be opposed, and electrodes disposed such that an anode and a cathode are opposed to sandwich the bipolar membrane laminated body;
    a first water channel connected to the inflow port;
    a second water channel that connects the outflow port and a supply port to which water subjected to water softening treatment by the electrochemical cell is supplied;
    a connection channel that connects the second water channel and the first water channel;
    a tank disposed in the connection channel;
    a channel switch that switches a flow destination of the water flowing in the second water channel to the supply port or the connection channel; and
    a pump provided in the connection channel.

23. An operating method for water treatment device, the water treatment device including:
    an electrochemical cell having a casing provided with an inflow port of water in a lower portion, and an outflow port of the water in an upper portion, a bipolar membrane laminated body in which two or more bipolar membranes are laminated so as to be opposed, and electrodes disposed such that an anode and a cathode are opposed to sandwich the bipolar membrane laminated body;
    a first water channel connected to the inflow port;
    a second water channel that connects the outflow port and a supply port to which water subjected to water softening treatment by the electrochemical cell is supplied;
    a connection channel that connects the second water channel and the first water channel;
    a tank disposed in the connection channel;
    a channel switch that switches a flow destination of the water flowing in the second water channel to the supply port or the connection channel; and
    a pump provided in the connection channel, the operating method comprising:
    switching a flow destination of water flowing in the second water channel to the connection channel by the channel switch, which is defined as a step A; and
    activating the pump, which is defined as a step B.

24. The operating method for the water treatment device according to claim 23, the water treatment device further including:
    a first tank;
    a second tank;
    a first switch; and
    a second switch, the first tank, the second tank, the first switch, and the second switch being provided in the connection channel, the connection channel including:
    a first connection channel one end of which is connected to the second water channel,
    a second connection channel one end of which is connected to the first water channel,
    a first bifurcating channel that connects another end of the first connection channel and the first tank,
    a second bifurcating channel that connects the other end of the first connection channel and the second tank, a first confluence channel that connects the first tank and another end of the second connection channel, and a second confluence channel that connects the second tank and the other end of the second connection channel, the first switch being configured to switch a flow destination of water flowing in the first connection channel to the first tank or the second tank, and the second switch being configured to switch, to the first tank or the second tank, a supply source of water to be supplied to the second connection channel, wherein the step B includes:

switching the flow destination of the water flowing in the first connection channel to the first tank by the first switch, switching the supply source of the water to be supplied to the second connection channel to the first tank by the second switch, and then activating the pump, which are defined as a step B1; and switching the flow destination of the water flowing in the first connection channel to the second tank by the first switch, switching the supply source of the water to be supplied to the second connection channel to the second tank by the second switch, and then activating the pump, which are defined as a step B2.

25. The operating method for the water treatment device according to claim 24, wherein a volume of the second tank is configured to be larger than a volume of the first tank.

* * * * *